United States Patent
Aggarwal

(10) Patent No.: US 8,898,353 B1
(45) Date of Patent: Nov. 25, 2014

(54) SYSTEM AND METHOD FOR SUPPORTING VIRTUAL HOST BUS ADAPTOR (VHBA) OVER INFINIBAND (IB) USING A SINGLE EXTERNAL MEMORY INTERFACE

(71) Applicant: Oracle International Corporation, Redwood Shores, CA (US)

(72) Inventor: Uttam Aggarwal, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/096,987

(22) Filed: Dec. 4, 2013

(51) Int. Cl.
- *G06F 3/00* (2006.01)
- *G06F 5/00* (2006.01)
- *G06F 5/06* (2006.01)

(52) U.S. Cl.
CPC ........................ *G06F 5/065* (2013.01)
USPC .............................. 710/56; 718/104

(58) Field of Classification Search
None
See application file for complete search history.

(56) References Cited

U.S. PATENT DOCUMENTS

| | | | |
|---|---|---|---|
| 8,458,306 B1* | 6/2013 | Sripathi | 709/221 |
| 2002/0116568 A1* | 8/2002 | Oksanen | 711/101 |
| 2003/0037096 A1* | 2/2003 | Kao | 709/202 |
| 2003/0145012 A1* | 7/2003 | Kurth | 707/100 |
| 2010/0313256 A1* | 12/2010 | Sekiguchi et al. | 726/7 |
| 2011/0004708 A1* | 1/2011 | Kondo et al. | 710/38 |
| 2013/0275668 A1* | 10/2013 | Luo | 711/112 |

* cited by examiner

*Primary Examiner* — Elias Mamo
(74) *Attorney, Agent, or Firm* — Meyer IP Law Group

(57) ABSTRACT

A system and method can support input/output (I/O) virtualization in a computing environment. The system comprise a free buffer pool that contains a plurality of packet buffers associated with one or more virtual host bus adaptors (vHBAs), wherein each said vHBA maintains a main linked list of buffer pointers that point to one or more packet buffers. Furthermore, a context table can be defined on an on-chip memory associated with an input/output (I/O) device, wherein the context table maintains a temporary linked list of buffer pointers that point to one or more packet buffers allocated for a disk read operation. The I/O device can open the context table when the I/O device receives disk read data from a physical host bus adaptor (HBA), update the temporary linked list of buffer pointers, and merge the temporary linked list into the main linked list when the context table is closed.

20 Claims, 18 Drawing Sheets

SYSTEM AND METHOD FOR SUPPORTING VIRTUAL HOST BUS ADAPTOR (VHBA) OVER INFINIBAND (IB) USING A SINGLE EXTERNAL MEMORY INTERFACE

CROSS REFERENCE TO RELATED APPLICATIONS

This application is related to the following patent applications, each of which is hereby incorporated by reference in its entirety:

U.S. Patent Application titled "SYSTEM AND METHOD FOR MANAGING HOST BUS ADAPTOR (HBA) OVER INFINIBAND (IB) USING A SINGLE EXTERNAL MEMORY INTERFACE", U.S. application Ser. No. 14/096,949, filed Dec. 4, 2013; and U.S. Patent Application titled "SYSTEM AND METHOD FOR SUPPORTING EFFICIENT BUFFER USAGE WITH A SINGLE EXTERNAL MEMORY INTERFACE", U.S. application Ser. No. 14/097,009, filed Dec. 4, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting input/output (I/O) virtualization in a computing environment.

BACKGROUND

The InfiniBand (IB) technology has seen increased deployment as the foundation for a cloud computing fabric. Furthermore, as larger cloud computing architectures are introduced, the performance and administrative bottlenecks associated with the traditional network and storage have become a significant problem. This is the general area that embodiments of the invention are intended to address.

SUMMARY

Described herein are systems and methods that can support input/output (I/O) virtualization in a computing environment. The system can comprise a free buffer pool in a memory. An I/O device operates to use the free buffer pool to store disk read data received from a physical host bus adaptor (HBA). The free buffer pool can contain a two-dimensional linked list and a one-dimensional linked list. Each entry of the two-dimensional linked list contains multiple packet buffers in consecutive memory locations, and each entry of the one-dimensional linked list contains a single packet buffer.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network as an example for a high performance network. It will be apparent to those skilled in the art that other types of high performance network can be used without limitation. Also, the invention as following uses the fiber channel (FC) storage network as an example for a storage network. It will be apparent to those skilled in the art that other types of storage network can be used without limitation.

Described herein are systems and methods that can support input/output (I/O) virtualization using one or more virtual host bus adaptors (vHBAs).

Input/Output (I/O) Virtualization

I/O virtualization can be supported on an IB fabric based on two different memory interfaces.

Figure 1:
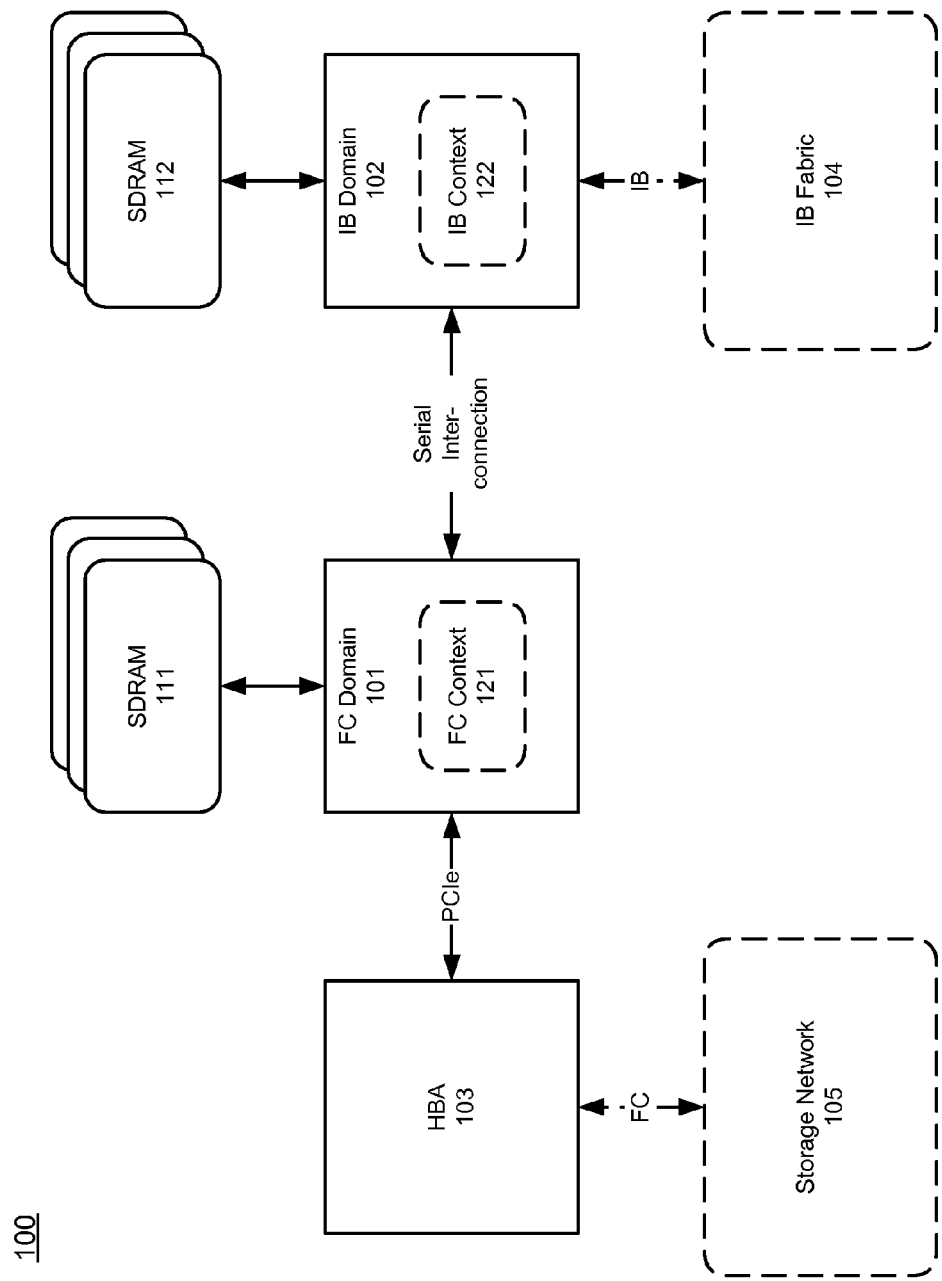
FIG. 1 shows an illustration of supporting input/output (I/O) virtualization using different memory interfaces.

FIG. 1 shows an illustration of supporting input/output (I/O) virtualization using different memory interfaces. As shown in FIG. 1, an I/O device 100 can use a fiber channel (FC) domain 101 and an InfiniBand (IB) domain 102 to handle ingress traffic, such as disk read data from the storage network 105 to the IB fabric 104.

As shown in FIG. 1, the fiber channel (FC) domain 101 can be connected to a physical host bus adaptor (HBA) 103. The physical HBA 103 can perform disk read operations, e.g. using FC commands, and can send data and context to the FC domain 101, e.g. using peripheral component interconnect express (PCI Express or PCIe) commands.

The FC domain 101 can maintain a FC context list 121, which can include various virtual host bus adaptors (vHBAs) related information and context. Furthermore, the FC domain 101 can store the received disk read data and/or context into an external memory, e.g. synchronous dynamic random access memory (SDRAM) 111.

As shown in FIG. 1, the FC domain 101 and the IB domain 102 are connected directly using serial interconnection. Furthermore, the IB domain 102 can receive FC data and context from the FC domain 101, and can map the received FC data and context to the different queue pairs (QPs) in the IB context list 122, for sequence ordering and context management. Also, the IB domain 102 can store the received disk read data and context, which can be in an IB format, in an external memory, e.g. SDRAM 112. Then, the IB domain 102 can transport this information to the IB fabric 104.

Thus, the system can use multiple different memory interfaces for handling ingress traffic from the storage network 105 to the IB fabric 104.

Single Memory Interface

In accordance with an embodiment of the invention, the system can use a single memory interface to support I/O virtualization, such as managing parallel FC contexts for different virtual HBAs created on an IB fabric for both the ingress traffic and the outgress traffic.

Figure 2:
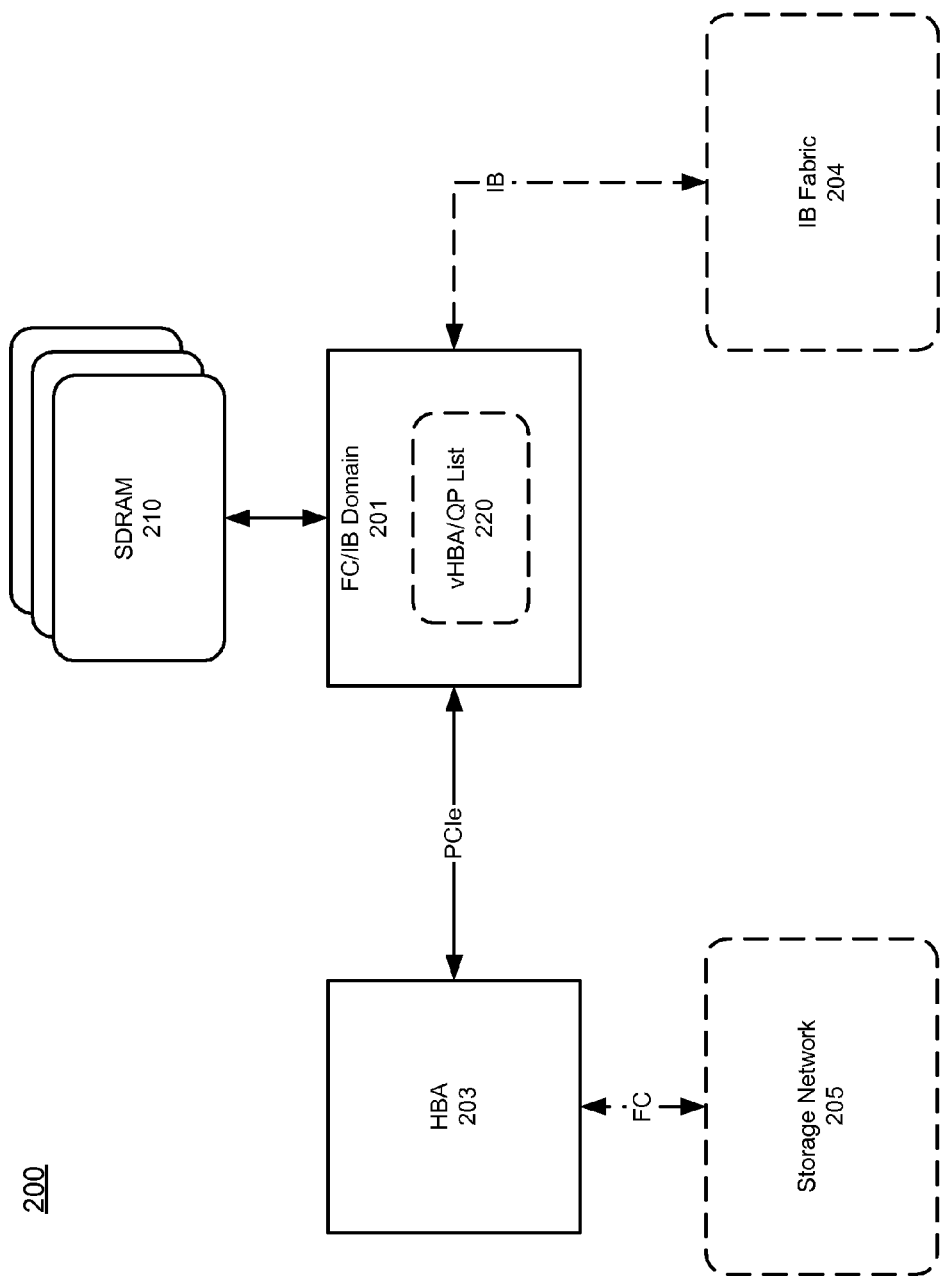
FIG. 2 shows an illustration of supporting input/output (I/O) virtualization using a single memory interface, in accordance with an embodiment of the invention.

FIG. 2 shows an illustration of supporting input/output (I/O) virtualization using a single memory interface, in accordance with an embodiment of the invention. As shown in FIG. 2, an I/O device 200 can use a chip representing a single FC/IB domain 201 to handle the ingress traffic, such as disk read data from a storage network 205 to an IB fabric 204.

The single FC/IB domain 201 can connect directly to a physical host bus adaptor (HBA) 203, which can perform disk read operations using FC commands. The physical HBA 203 can send disk read data and context to the FC/IB domain 201 using PCIe commands. Then, the FC/IB domain 201 can send the received disk read data and context to the IB fabric 204 using an IB protocol.

As shown in FIG. 2, the FC/IB domain 201 can maintain a vHBA/QP information list 220, which maps the received FC data and context to the different queue pairs (QPs) in an IB context list for sequence ordering and context management. Also, the FC/IB domain 201 can store the disk read data and context, which is in an IB format, into the external memory, e.g. SDRAM 210.

In accordance with an embodiment of the invention, the merging of the FC context list with the IB reliable connection (RC) queue pair (QP) list allows the use of single memory interface instead of two different memory interfaces. For example, the system can maintain a dynamic list of temporary context lists for the external memory buffers before mapping this temporary list to the IB domain. This approach can avoid the use of two different external memories and also can avoid sending back pressure messages from an IB domain to an FC domain. Thus, the system can avoid storing the same data and/or context for multiple times, and improve the latency. Additionally, the use of single chip and memory interface, instead of two different chips and memory interfaces, can reduce the cost of the system.

Additionally, the system removes dependency on external (e.g. vendor specific) interfaces to communicate between two different domains. Since a single memory interface is used, the FC/IB domain 201 knows the buffer sizes and can avoid overrunning the buffer in the external memory, e.g. SDRAM 210. This single memory interface approach also allows for better flush operation when a vHBA goes down. Since there is no message passing back and forth between IB domain and FC domain, a flush operation can be performed in a clean and fast fashion.

Figure 3:
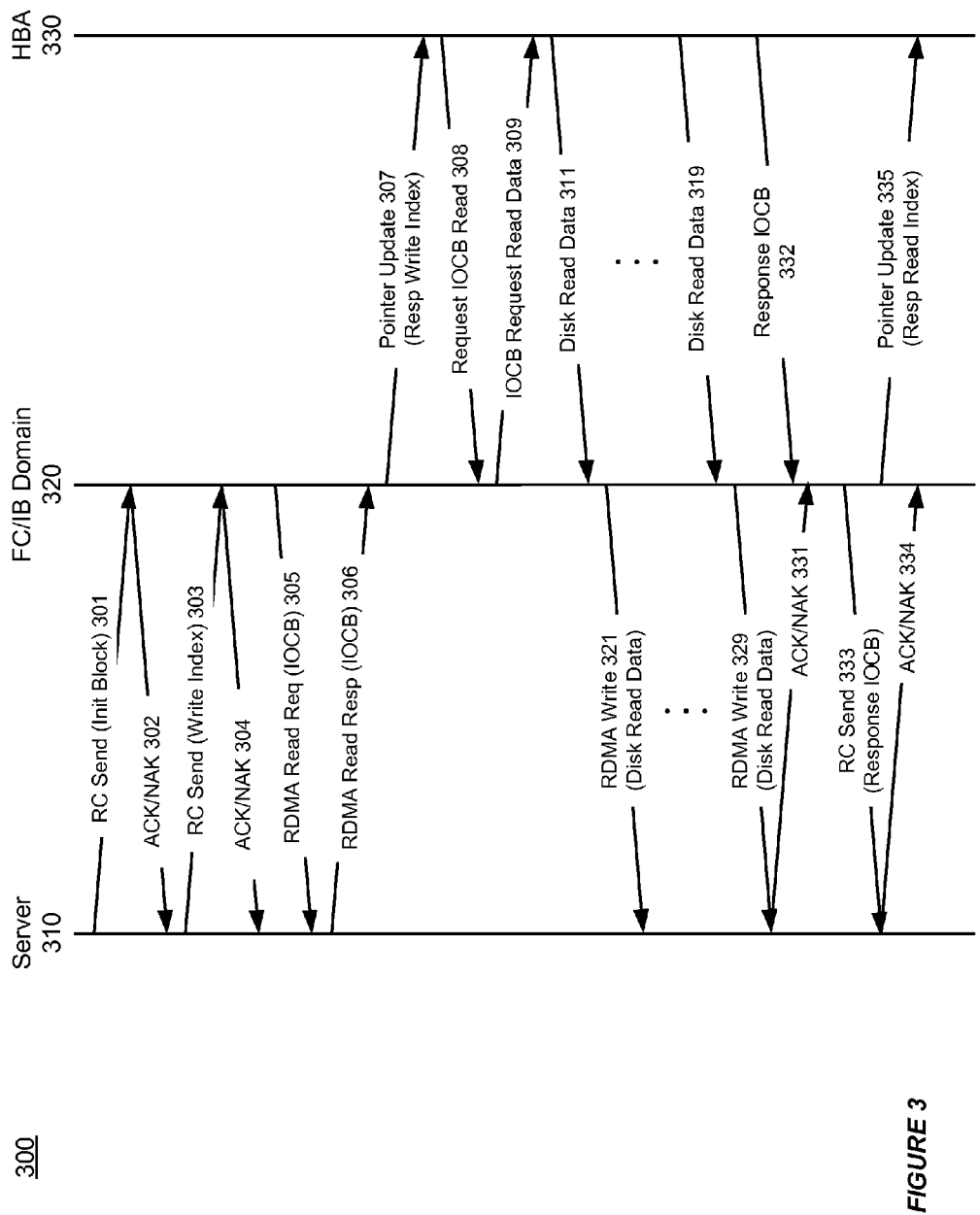
FIG. 3 shows an illustration of supporting a scheme for handling ingress traffic using a single memory interface, in accordance with an embodiment of the invention.

FIG. 3 shows an illustration of supporting a scheme 300 for handling the ingress traffic using a single memory interface, in accordance with an embodiment of the invention. As shown in FIG. 3, a FC/IB domain 320, which is associated with a single memory interface, can be used to handle the ingress traffic from a physical host bus adaptor (HBA) 330, which connects to a storage network, to a server 310 on an IB fabric.

At step 301, the server 310 can initiate a disk read operation by sending an initialization block to the FC/IB domain 320, e.g. as an RC send message. Then, at step 302, the FC/IB domain 320 can acknowledge the server 310 the receiving of the message.

Subsequently, at step 303, the server 310 can update the write index for the descriptor ring, and can indicate to the FC/IB domain 320 that one or more new input/output control blocks (IOCBs) are present. Then, at step 304, the FC/IB domain 320 can acknowledge the server 310 the receiving of the message.

Furthermore, the FC/IB domain 320 can compare the received write index value with a read Index value. If different, at step 305, the FC/IB domain 320 can try to fetch one or more IOCBs from the server 310, using an RDMA read command. Then, at step 306, the server 310 can send one or more IOCBs to the FC/IB domain 320 as RDMA read response data.

Once the FC/IB domain 320 receives an IOCB from the server 310, the FC/IB domain 320 can open a context if it is available. Here, a context is a state for a particular command maintained on chip using on-chip memory. Then, the FC/IB domain 320 can push this IOCB command to the physical HBA 330.

For example, at step 307, the FC/IB domain 320 can update a pointer, e.g. a response write index, which indicates to the HBA 330 that a request IOCB is available. Then, at step 308, the HBA 330 can try to read the request IOCB, and at step 309, the FC/IB domain 320 can send IOCB request read data to the HBA 330. Thus, the HBA 330 can perform disk read operations accordingly.

In accordance with an embodiment of the invention, the above steps 301-309 can happen concurrently for processing parallel server IOCB commands, i.e. the FC/IB domain 320 can maintain and process multiple parallel contexts simultaneously.

Furthermore, at steps 311-319, the HBA 330 can send the disk read data to the FC/IB domain 320, which in turn, at steps 321-329, can perform RDMA write operations to send the disk read data to the server 310 on the IB fabric.

In accordance with an embodiment of the invention, the system can ensure that the disk read data is completely transferred to server 310 or a host. At step 331, the server 310 can send a message to the FC/IB domain 320 for acknowledging the reception of the disk read data.

Furthermore, at step 332, once the complete disk read data has been transferred by the physical HBA 330, the physical HBA 330 can send a response IOCB to the FC/IB domain 320 to indicate that the corresponding IOCB request has been completely processed. Accordingly, at step 333, the FC/IB domain 320 can send the response IOCB to the server 310 using a RC send message.

Finally, at step 334, the server can acknowledge the reception of the response IOCB, and at step 335, the FC/IB domain 320 can update a pointer, e.g. a response read index, which indicates to the HBA 330 that a response IOCB is sent to the server 310.

In accordance with an embodiment of the invention, the FC/IB domain 320 can handle different types of traffic in the ingress data path, such as the RDMA read requests for a context on a vHBA, the disk read data from the physical HBA, and response IOCBs received from the physical HBA for the context on the vHBA. Here, the RDMA read requests for the disk write data fetch can be generated internally by the FC/IB domain 320, whereas disk read data and response IOCBs can be received from the physical HBA via a PCI-Express bus.

Figure 4:
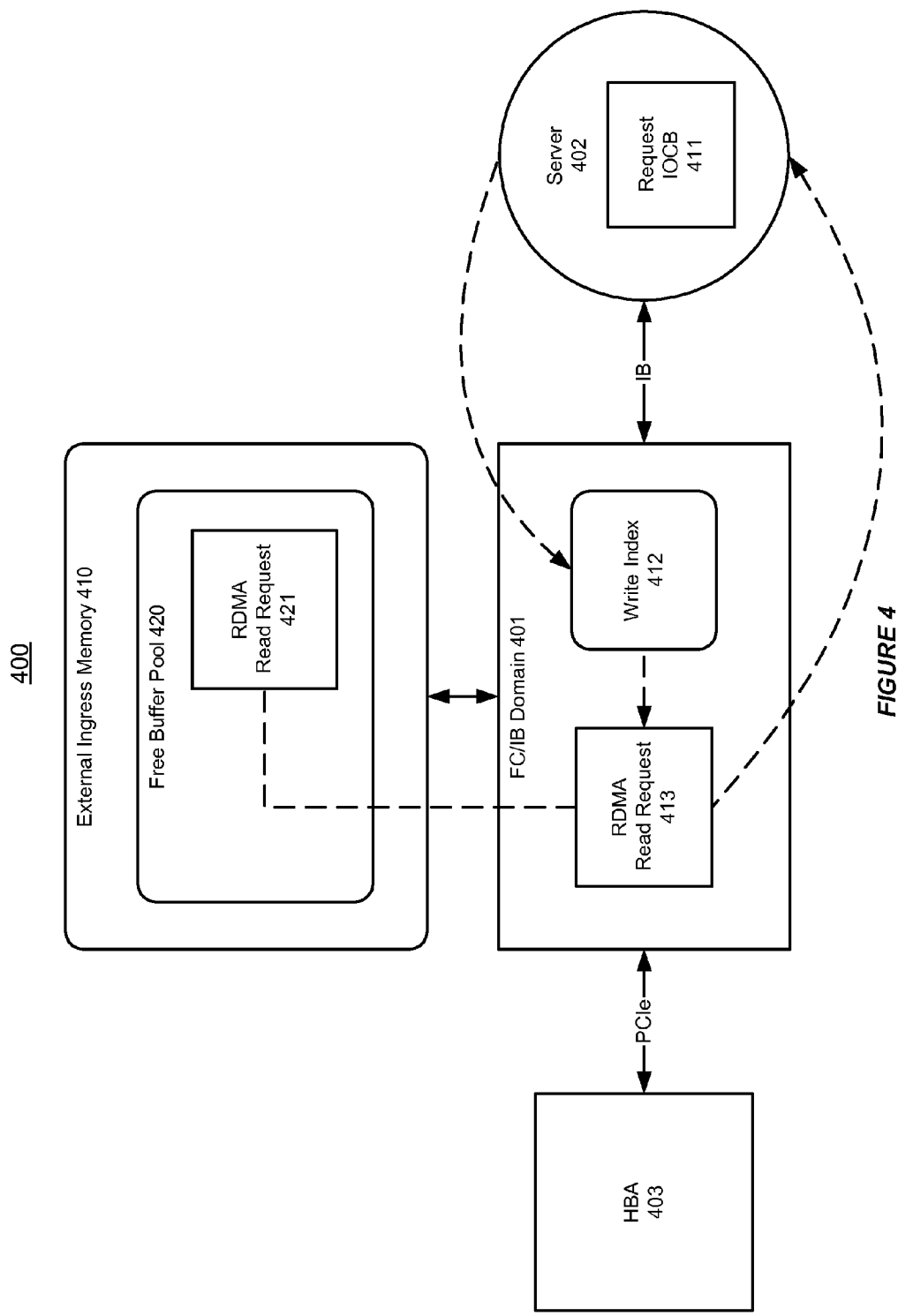
FIG. 4 shows an illustration of initiating a disk read operation on an I/O device, in accordance with an embodiment of the invention.

FIG. 4 shows an illustration of initiating a disk read operation on an I/O device, in accordance with an embodiment of the invention. As shown in FIG. 4, an I/O device 400, such as a chip representing a FC/IB domain 401, can obtain a write index 412 from a server 402 on an IB fabric.

The FC/IB domain 401 can compare the obtained write index 412 value with a copy of the read Index value. If different, the FC/IB domain 401 can fetch one or more request IOCBs 411 from the server 402, using RDMA read commands 413. Additionally, these RDMA read commands 413 can be converted into an IB format, and can be stored in a free buffer pool 420 in an external ingress memory 410 associated with the FC/IB domain 401.

Here, before storing the RDMA read command 421 in the ingress DRAM 410, the en-queue logic can make sure that there is a buffer available in the external ingress memory 410 for the RDMA read request. Then, the FC/IB domain 401 can proceed to handle the ingress traffic from a physical HBA 403 to a server 402.

Figure 5:
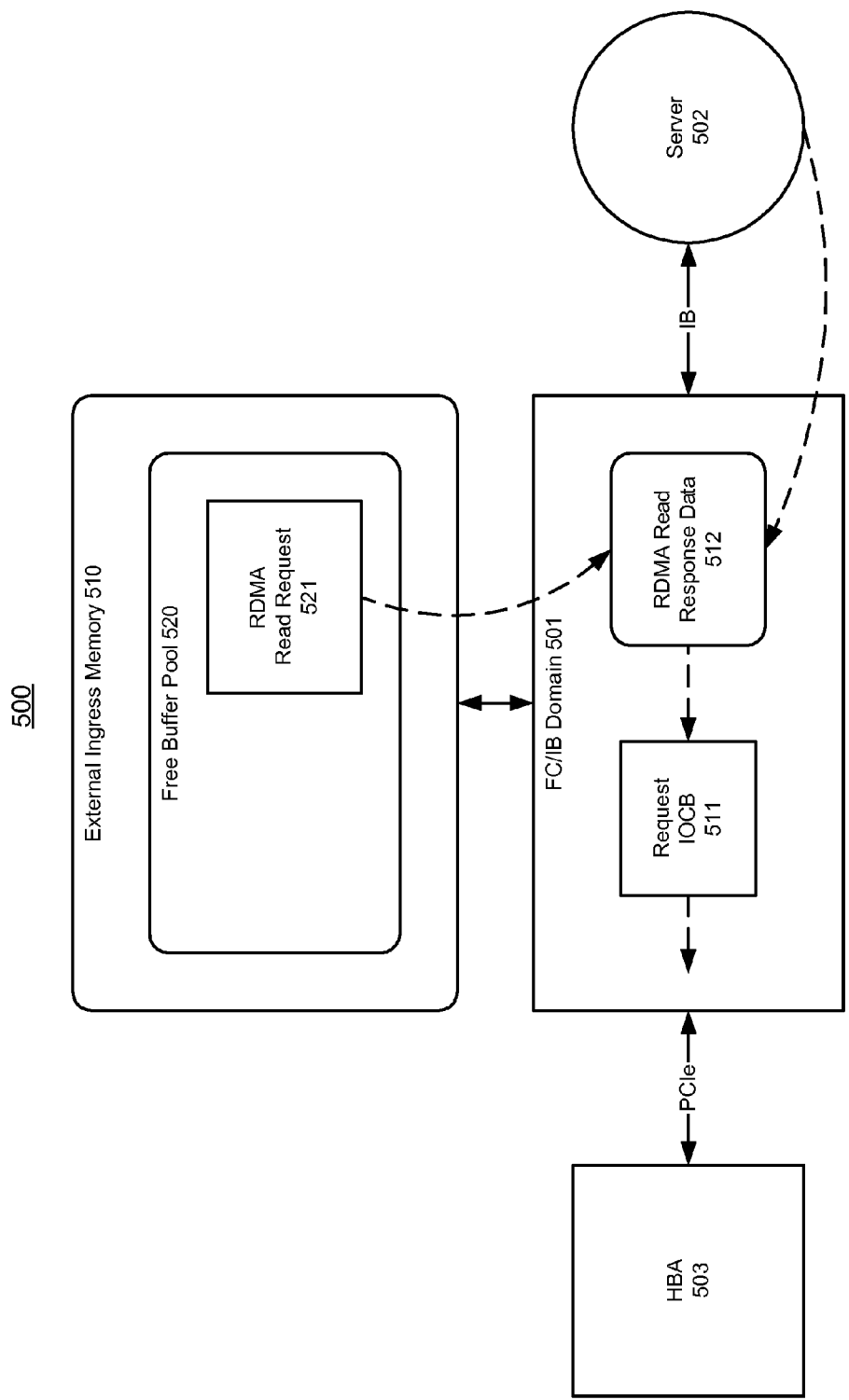
FIG. 5 shows an illustration of extracting a request IOCB on an I/O device, in accordance with an embodiment of the invention.

FIG. 5 shows an illustration of extracting a request IOCB on an I/O device, in accordance with an embodiment of the invention. As shown in FIG. 5, an I/O device 500, such as a chip representing a FC/IB domain 501, can receive RDMA read response data from the server 502 on an IB fabric.

Once complete RDMA read response data 512 is received from the server 502 as expected using the IB protocol, the FC/IB domain 501 can de-queue a stored RDMA read request command 521 in the free buffer pool 520 in the external ingress memory 510. Then, the FC/IB domain 501 can match the received RDMA read response data 512 with the stored RDMA read request 521.

Furthermore, the FC/IB domain 501 can parse the received RDMA read response data 512 and extract the request IOCBs 511 contained in the RDMA read response data 512, before passing the request IOCBs 511 to the HBA 503.

Figure 6:
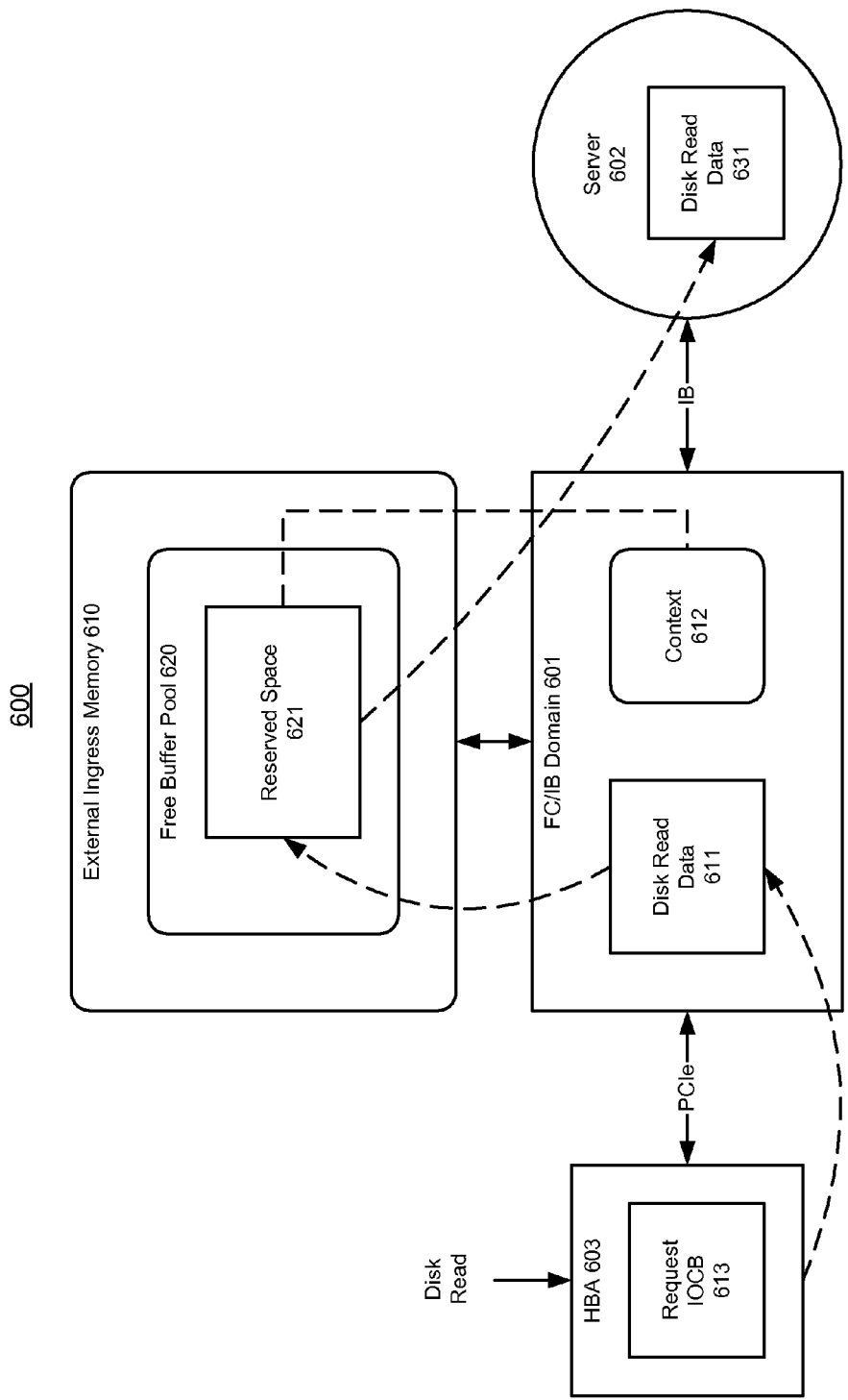
FIG. 6 shows an illustration of handling disk read data on an I/O device, in accordance with an embodiment of the invention.

FIG. 6 shows an illustration of handling disk read data on an I/O device, in accordance with an embodiment of the invention. As shown in FIG. 6, an I/O device 600, such as a chip representing a FC/IB domain 601, can open a context 612 for a request IOCB 613 before passing it to the HBA 603.

In accordance with an embodiment of the invention, the FC/IB domain 601 can make sure that it has enough space (e.g. a reserved DRAM space 621 in an external ingress memory 610) to store the disk read data 611 coming from the HBA 603 for a request IOCB command 613, before opening the context 612 for a request IOCB 613. Thus, the system can ensure that the FC/IB domain 601 does not back pressure the physical HBA 603, once a disk read command (e.g. in the request ICOB 613) is issued.

Furthermore, after receiving the disk read command in the IOCB command 613 from the FC/IB domain 601, the HBA 603 can perform the actual disk read operations on the storage (e.g. using the FC protocol), and the HBA 603 can return the disk read data 611 to FC/IB domain 601 using PCI/PCIe write transactions.

Since the FC/IB domain 601 has already reserved the space 621 in a free buffer pool 620 in the external ingress memory 610 for the disk read command when opening the context, the FC/IB domain 601 can start writing the received disk read data 611 into the packet buffers in the external ingress memory 610. Additionally, the FC/IB domain 601 can add the IB headers and sequence numbers to the packets received for the disk read data 611, before writing the disk read data into the packet buffers in the external ingress memory 610. Thus, the stored packets received for the disk read data 611 can be in an IB format.

Additionally, the FC/IB domain 601 can read out the stored disk read data 611 in the external ingress memory 610, when a complete message (e.g. an RDMA read request) is available, or when an IB maximum transmission unit (MTU) packet (e.g. an RDMA write only packet) is available. Subsequently, the FC/IB domain 601 can send the IB packets read out from the free buffer pool 620 in the external ingress memory 610 to the server 602 on an IB fabric, as disk read data 631.

Figure 7:
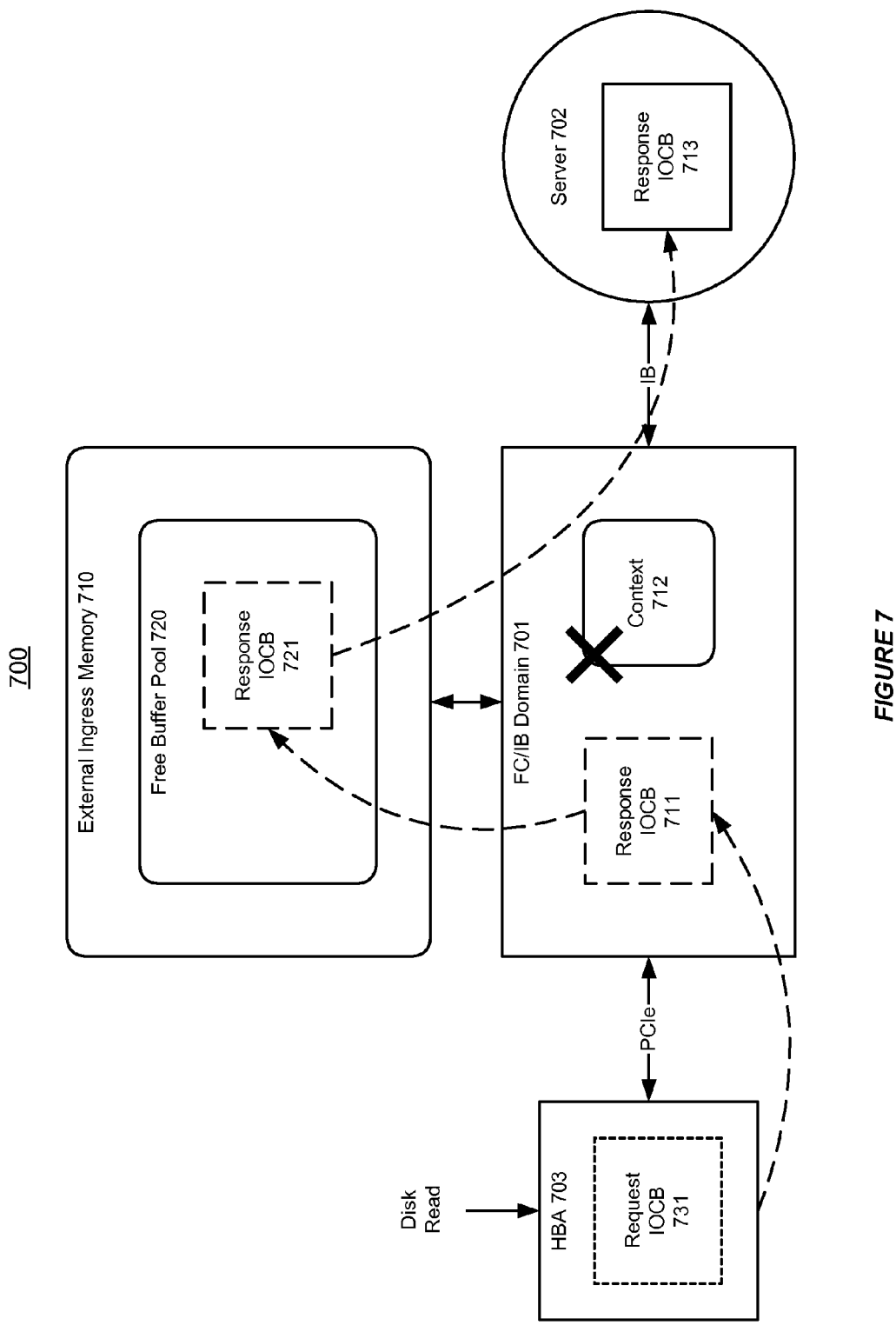
FIG. 7 shows an illustration of handling the completion of a disk read operation on an I/O device, in accordance with an embodiment of the invention.

FIG. 7 shows an illustration of handling the completion of a disk read operation on an I/O device, in accordance with an embodiment of the invention. As shown in FIG. 7, an I/O device 700, such as a chip representing a FC/IB domain 701 can be used to handle the ingress traffic from a physical HBA 703 to a server 702 on an IB fabric.

Once the disk read data has been completely transported, the HBA 703 can send a response IOCB 711 to the FC/IB domain 701 to indicate that the corresponding IOCB request 731 associated with a context 712 has been completely processed. Then, the FC/IB domain 701 can add an IB header and a sequence number to the response IOCB 711 and can store the response IOCB 721 in a free buffer pool 720 in an external ingress memory 710.

Once a message or a packet is ready to be sent out, the FC/IB domain 701 can send the response IOCB 721 to the host/server 702 using the IB protocol. Then, the host/server 702 can be aware that the disk read request IOCB command 731 has been completely handled by the hardware, after receiving the response IOCB 713.

Furthermore, the FC/IB domain 701 can close the related context 712 (i.e. can clear the state memory and delete the reserved space in the external ingress memory 710), after sending the response IOCB 721 for the context.

Multiple Contexts

Figure 8:
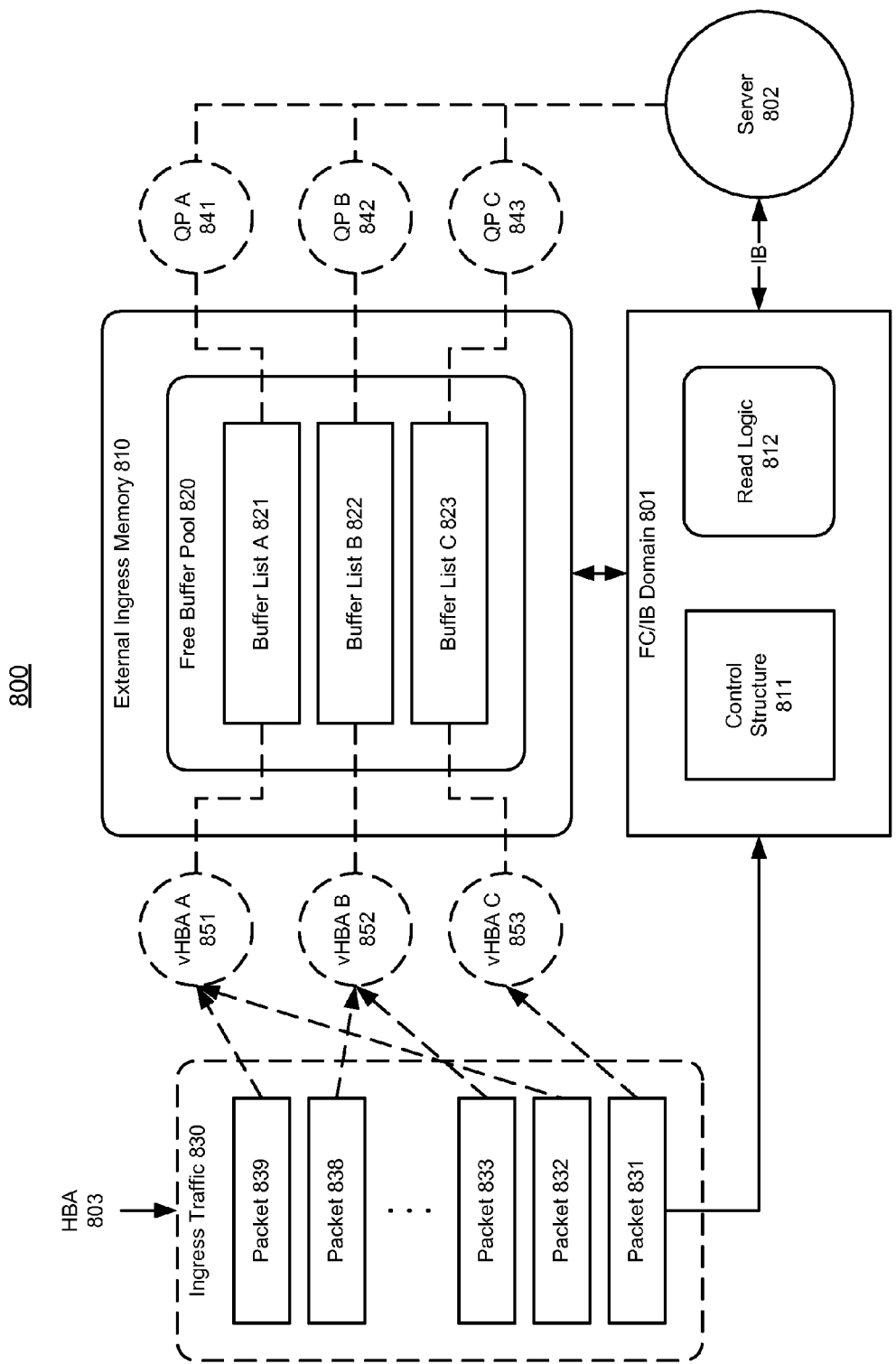
FIG. 8 shows an illustration of supporting I/O virtualization using multiple virtual host bus adaptors (vHBAs), in accordance with an embodiment of the invention.

FIG. 8 shows an illustration of supporting I/O virtualization using multiple virtual host bus adaptors (vHBAs), in accordance with an embodiment of the invention. As shown in FIG. 8, an I/O device 800, e.g. a chip representing a FC/IB domain 801, can be used to handle the ingress traffic 830. The ingress traffic 830 can include a plurality of packets, e.g. packets 831-839, transporting from a physical HBA 803 to a server 802 on an IB fabric.

Furthermore, the FC/IB domain 801 can support one or more vHBAs, e.g. vHBAs A-B 851-853, each of which can correspond to a queue pair (QP) that is associated with the IB server 802, e.g. QPs A-C 841-843.

Additionally, the FC/IB domain 801 can use an external ingress memory 810 to store one or more received packets. The FC/IB domain 801 can merge the FC context information, such as the vHBAs A-C 851-853, with the IB context list, such as the QPs A-C 841-843, in order to support the use of a single memory interface.

As shown in FIG. 8, the external ingress memory 810 can provide a free buffer pool 820. The free buffer pool 820 includes one or more buffer lists, e.g. buffer lists A-C 821-823, each of which can be used to store one or more received packets that target a particular QP (or vHBA).

For example, the FC/IB domain 801 can en-queue the packets 832 and 839, which targets the QP A 841, in the buffer list A 821, which is associated with the vH BAA 851. Additionally, the FC/IB domain 801 can en-queue packets 833 and 838, which targets the QP B 842, in the buffer list B 822, which is associated with the vHBA B 852, and the FC/IB domain 801 can en-queue packets 831, which targets the QP C 843, in the buffer list C 823, which is associated with the vHBA C 853.

Moreover, the FC/IB domain 801 can include a control structure 811 that can maintain the state of the plurality of received packets 831-839. Also, the FC/IB domain 801 can use a read logic 812 to read out one or more stored packets 831-839.

In accordance with an embodiment of the invention, the FC/IB domain 801 can open multiple contexts in the vHBAs A-C 851-853, in order to support the multiplexing of multiple disk read commands, RDMA read requests and RC send commands for a QP in an IB domain.

Figure 9:
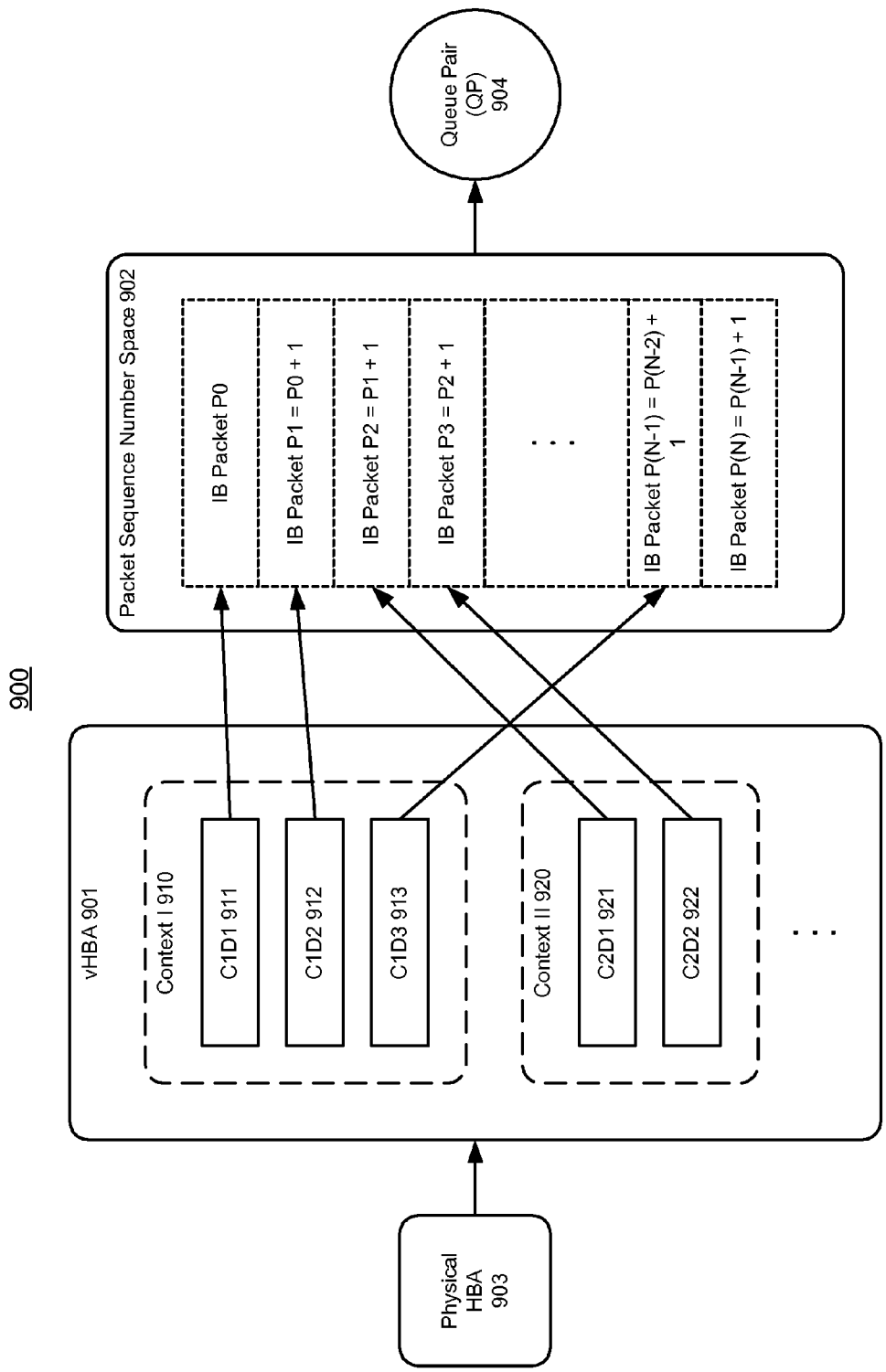
FIG. 9 shows an illustration of supporting multiple contexts in a virtual host bus adaptor (vHBA), in accordance with an embodiment of the invention.

FIG. 9 shows an illustration of supporting multiple contexts in a virtual host bus adaptor (vHBA), in accordance with an embodiment of the invention. As shown in FIG. 9, an I/O device, e.g. a chip representing a FC/IB domain 900, can open multiple contexts, such as context I 910 and context II 920, in a single vHBA 901, e.g. for performing multiple disk read commands on a physical HBA 903 for a QP 904.

For example, context I 910 can include several packets, such as C1D1 911, C1D2 912, and C1D3 913, which are received from the physical HBA 903. Here, C1D1 911 may contain disk read data D1 for the context I 910, C1D2 912 may contain disk read data D2 for the context I 910, and C1D3 913 may contain disk read data D1 for the context I 910.

Also, context II 920 can include several packets, such as C2D1 921 and C2D2 922, which are received from the physical HBA 903. Here, C2D1 921 may contain disk read data D1 for the context II 920, and C2D2 922 may contain disk read data D2 for the context II 920.

Furthermore, before sending a packet that is received from the physical HBA 903 to a QP 904 on an IB fabric, the FC/IB domain 900 can add a corresponding sequence number (PSN) and different IB headers.

In accordance with an embodiment of the invention, all packets targeting the same QP, e.g. the QP 904 (i.e. associated with the vHBA 901), can share a single PSN space 902 within an IB domain. As shown in FIG. 9, within the PSN space 902, the packets can be organized in a sequence following the order from P0, P1, to P(N). Here, P1 equals to P0 plus 1, P2 equals to P1 plus 1, and each subsequent packet can have the next sequence number.

On the other hand, the sharing of the PSN space 902 in an IB domain may complicate the adding of the IB headers and sequence numbers to the packets received from the HBA 803 in different contexts based on a single memory interface, since it may not be possible to change the order of the outgoing packets on the fly using the PSN number assignment scheme in the IB domain.

As shown in FIG. 9, a head of line blocking issue may occur in vHBA 901, when the disk read data for context II 920 arrives before the processing of the disk read data for context I 910 is completely proceeded. For example, this scenario may appear when the FC/IB domain 900 tries to schedule a RDMA read request for a disk write operation, when the system is performing another disk write operation.

Figure 10:
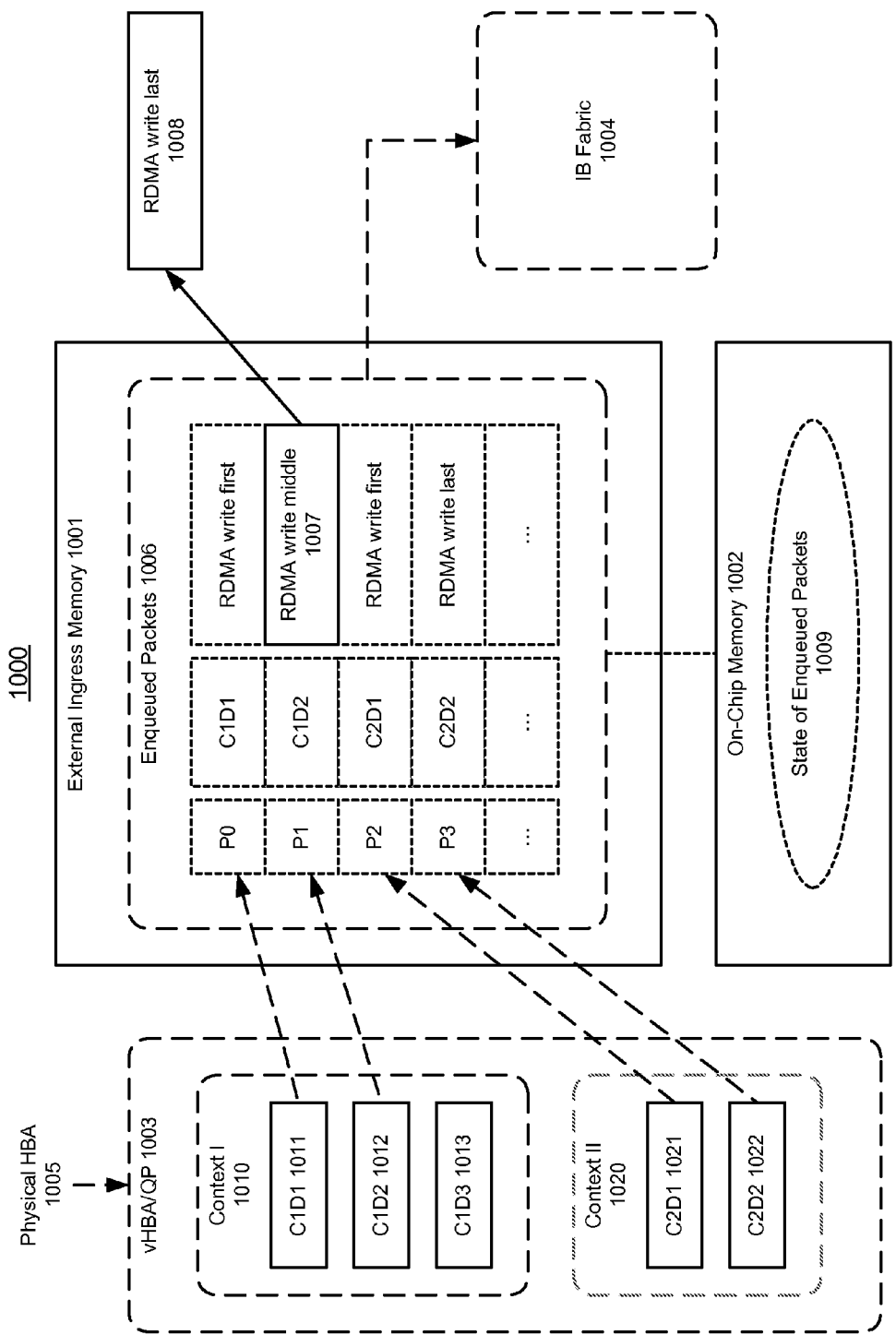
FIG. 10 shows an illustration of using an on-chip memory to maintain the status of the en-queued packets on external memory, in accordance with an embodiment of the invention.

FIG. 10 shows an illustration of using an on-chip memory to maintain the states of one or more en-queued packets in an external memory, in accordance with an embodiment of the invention. As shown in FIG. 10, an I/O device 1000, e.g. a chip representing a FC/IB domain 1000, can open multiple contexts, e.g. context I 1010 and context II 1020, in a single VHBA/QP 1003. Each context can include one or more packets, e.g. context I 1010 includes packets C1D1 1011, C1D2 1012, and C1D3 1013, and context II 1020 includes packets C2D1 1021 and C2D2 1022.

In accordance with an embodiment of the invention, the FC/IB domain 1000 can add a sequence number and various IB headers to each packet received from the physical HBA 1005. The IB header can include an IB command that can be applied to the specific packet, when it is sent to the IB fabric 1004.

For example, if the size of the disk read data for a context is equal to the size of the IB maximum transmission unit (MTU), the IB command en-queued in the IB header can be a "RDMA write only" command with virtual address (VA) pointed in the context memory. Otherwise, if the size of the disk read data for the given context is more than the size of the IB MTU, the disk read data can be split into multiple packets. The command en-queued in the IB header for each packet can be one of: a "RDMA write first" command, a "RDMA write middle" command, and a "RDMA write last" command, with VA pointed by the context memory. Depending on the length of the disk read, there can be zero or more packets en-queued with the "RDMA write middle" commands.

As shown in FIG. 10, the starting PSN is P0 and the disk read data is greater than IB MTU. When the first packet (C1D1 1011) arrives, the system can add a "RDMA write first" command to the packet along with a PSN, P0. Furthermore, when the next packet (C1D2 1012) arrives, the system can add a "RDMA write middle" command along with PSN, P1 (i.e. P0+1). Then, when the third packet (C2D1 1021) arrives, the system can add a "RDMA write first" command to the packet along with a PSN, P2 (i.e. P1+1). Additionally, when the packet (C2D2 1022) arrives, the system can add a "RDMA write last" command to the packet along with a PSN, P3 (i.e. P2+1).

There is a consistency problem in the above sequence of actions. The IB command added to the packet C1D2 1012 is a "RDMA write middle" command. The system may expect the command added to the next packet to be either a "RDMA write middle" command or a "RDMA write last" command, depending on the length of the disk read. As shown in FIG. 10, since the next packet, i.e. C2D1 1021, comes from a different context II 1020, the FC/IB domain 1000 may add a new command, i.e. a "RDMA write first" command or a "RDMA write only" command to the packet (even though the PSN is correct). Also, similar problem may occur when the FC/IB domain 1000 try to en-queue a RDMA read request either for a descriptor fetch or for performing a RC send IOCB response for another context.

In order to solve this problem, the system can update the IB command associated a previously en-queued packet accordingly. For example, the IB command for C1D2 1012, i.e. "RDMA write middle" 1007, can be changed to "RDMA write last" 1008, after the FC/IB domain 1000 receives the packet C2D1 1021.

In accordance with an embodiment of the invention, in order to ensure the consistency, the FC/IB domain 1000 can maintain an on-chip memory 1002 to store the state 1009 of the en-queued packets 1006 on the external memory 1001.

This on-chip memory 1002 can be beneficial in different perspectives. First, the read logic can be ensured to read the packet out from the external memory (and sent the packet to a host), only when the packet has been completely en-queued and an IB command associated with the packet has been updated, if necessary. Second, the IB command associated with a previously en-queued packet can be updated accordingly in order to support multiple contexts.

For example, the on-chip memory 1002 can be two-bit wide (and 64K deep). The first bit, for an entry in the on-chip memory 1002, e.g. Bit 0, can indicate whether an IB command needs to be changed or updated, and the second bit, e.g. Bit 1, can indicate whether the read logic in the FC/IB domain 1000 can fetch the en-queue packet out from the external memory 1001.

The following Table 1 shows the different packet states stored in an exemplary on-chip memory, when a sequence of packets arrives.

TABLE 1

| Packet from the Physical HBA | En-queue packet in external memory | On chip memory on current packet en-queue | On chip memory on next packet en-queue |
|---|---|---|---|
| C2D1 | RDMA write first, PSN P0, C2D1 | Bit 0: 0 Bit 1: 0 | Bit 0: 0 Bit 1: 1 |
| C2D2 | RDMA write middle, PSN P1, C2D2 | Bit 0: 0 Bit 1: 0 | Bit 0: 1 Bit 1: 1 |
| C1D1 | RDMA write first, PSN P2, C1D1 | Bit 0: 0 Bit 1: 0 | Bit 0: 0 Bit 1: 1 |
| C1D2 | RDMA write last, PSN P3, C1D2 | Bit 0: 0 Bit 1: 1 | Bit 0: 0 Bit 1: 1 |

As shown in the above Table 1, when the first packet, i.e. C2D1, is en-queued, the on-chip state memory is 2'b00, which indicates that the read logic can not read this packet out. This is because the system may have to change the command of this packet later on, when a packet from other context arrives.

When the next packet C2D2 comes, the on-chip state for the previous packet, i.e. C2D1, is changed to 2'b10, which indicates to the read logic that a packet has successfully been en-queued and is ready to be read out. No command change is necessary in this case, since C2D2 comes from the same context II (C2).

Furthermore, when the third packet, i.e. C1D1, arrives, the state of the on-chip memory for C2D2 is changed to 2'b11, which indicates to the read logic that a packet has been en-queued and commands may need to be changed on the read side. The read logic can read the packet out and change the command from "RDMA write middle" to "RDMA write last," before sending the packet out.

Figure 11:
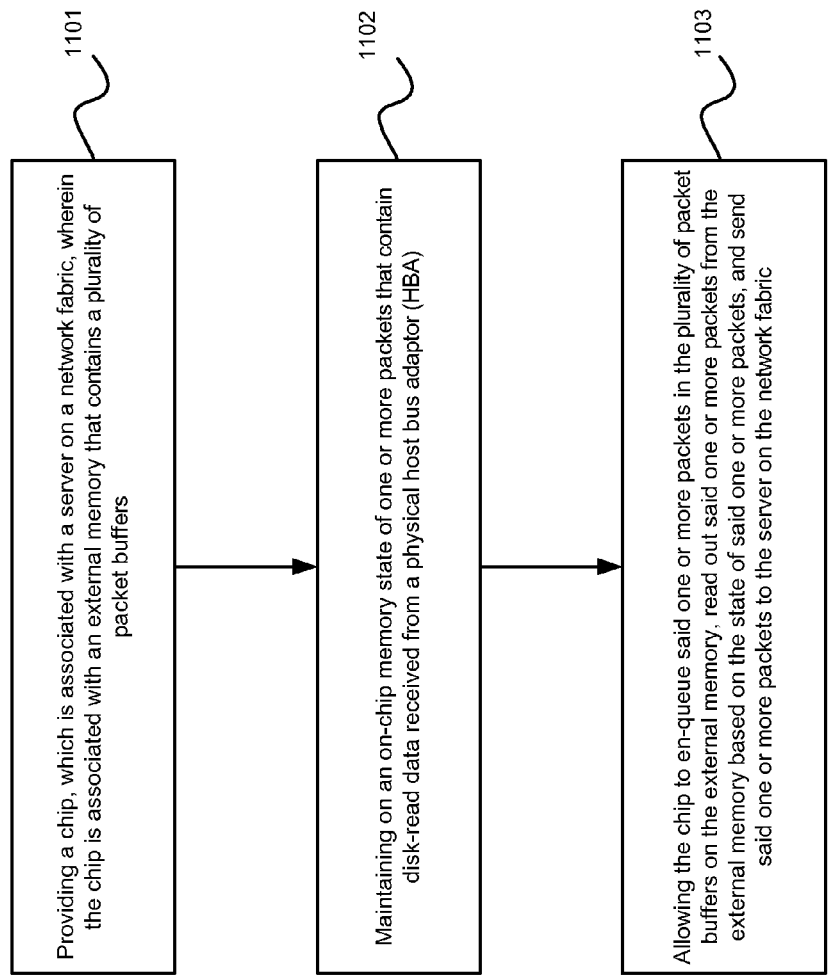
FIG. 11 illustrates an exemplary flow chart for supporting input/output (I/O) virtualization using a single memory interface, in accordance with an embodiment of the invention.

FIG. 11 illustrates an exemplary flow chart for supporting input/output (I/O) virtualization using a single memory interface, in accordance with an embodiment of the invention. As shown in FIG. 11, at step 1101, the system can provide a chip, which is associated with a server on a network fabric, wherein the chip is associated with an external memory that contains a plurality of packet buffers. Furthermore, at step 1102, the system can maintain on an on-chip memory state of one or more packets that contain disk-read data received from a physical host bus adaptor (HBA). Also, at step 1103, the system allows the chip to en-queue said one or more packets in the plurality of packet buffers on the external memory, read out said one or more packets from the external memory based on the state of said one or more packets, and send said one or more packets to the server on the network fabric.

Hybrid Linked List Structure

In accordance with an embodiment of the invention, the system can use a hybrid linked list structure to handle the ingress traffic associated with multiple contexts in a virtual host bus adaptor (vHBA). This hybrid linked list structure can include a main linked list and a temporary linked list.

Figure 12:
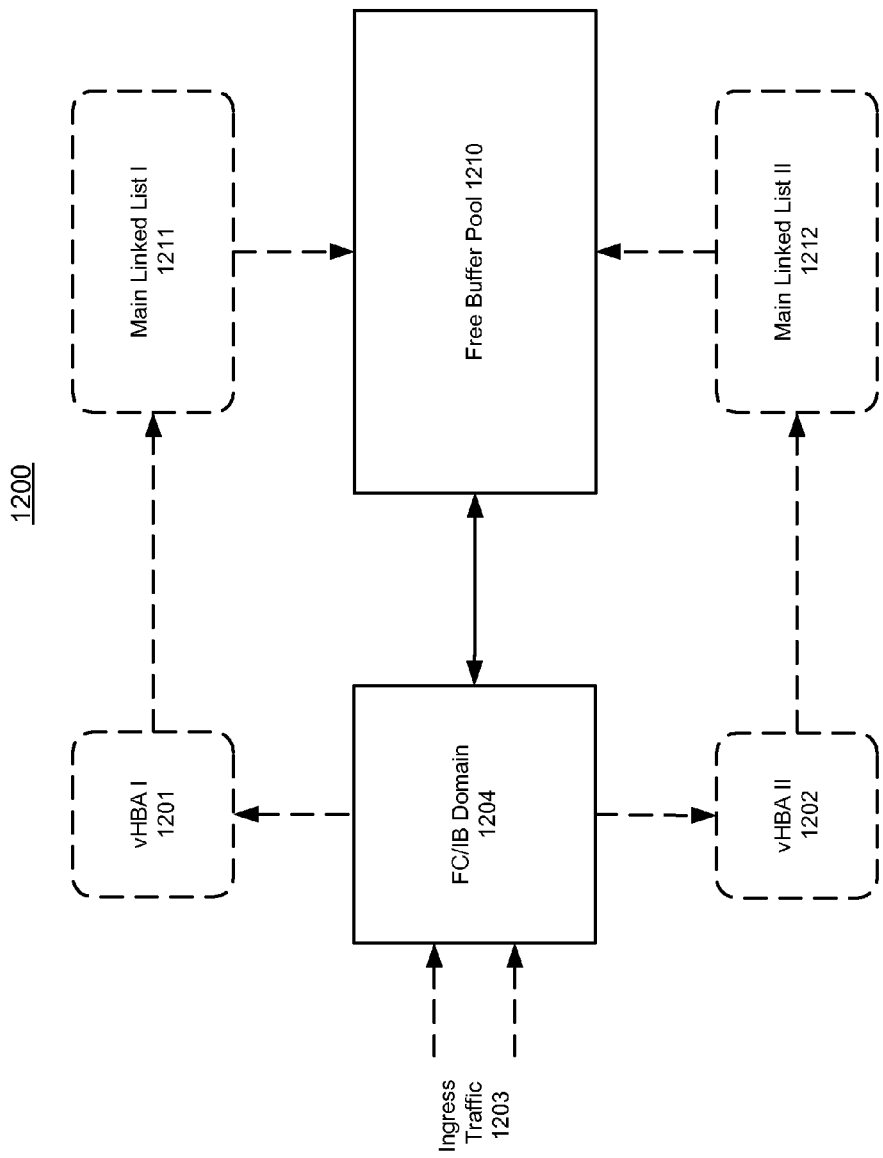
FIG. 12 shows an illustration of using a free buffer pool to support multiple virtual host bus adaptors (vHBAs), in accordance with an embodiment of the invention.

FIG. 12 shows an illustration of using a free buffer pool to support multiple virtual host bus adaptors (vHBAs), in accordance with an embodiment of the invention. As shown in FIG. 12, an I/O device 1200, e.g. a chip representing a FC/IB domain 1204, can use a free buffer pool 1210 to handle ingress traffic 1203, which may be associated with different virtual host bus adaptors (vHBAs), e.g. vHBAs I-II 1201-1202.

Furthermore, each vHBA can maintain one or more linked lists of buffer pointers, for supporting storing various packets received from the ingress traffic 1203 in the packet buffers in the free buffer pool 1210. For example, vHBA I 1201 can maintain a main linked list I 1211, while vHBA II 1202 can maintain a main linked list II 1212.

Figure 13:
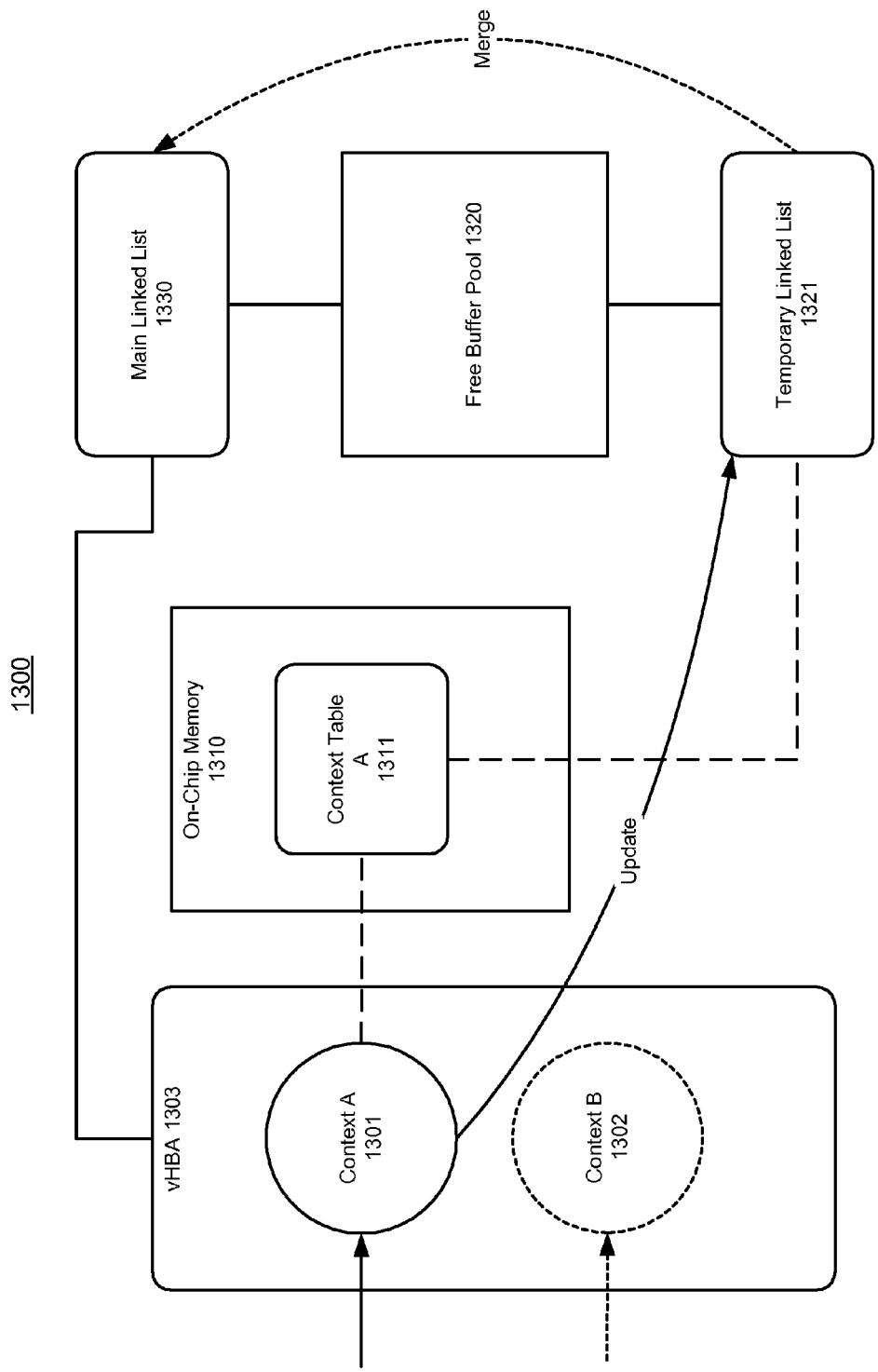
FIG. 13 shows an illustration of using a hybrid link list structure to support disk read operations, in accordance with an embodiment of the invention.

FIG. 13 shows an illustration of using a hybrid linked list structure to support various disk read operations, in accordance with an embodiment of the invention. As shown in FIG. 13, an I/O device 1300, e.g. a chip representing a FC/IB domain, can open multiple contexts, e.g. a context A 1301 and a context B 1302, in a single vHBA 1303, for performing multiple disk read operations in parallel.

In accordance with an embodiment of the invention, the FC/IB domain can define a context table on the on-chip memory for each disk read operation. For example, when the FC/IB domain receives the disk read data for context A 1301, the FC/IB domain can open a context table A 1311 on the on-chip memory 1310. Additionally, the context table A 1311 can maintain a temporary linked list 1321 of buffer pointers, which point to one or more packet buffers that are allocated from the free buffer pool 1320. The context table A 1311 can also maintain the virtual addresses for a given transaction.

Furthermore, as the ingress data coming for the context A 1301, the disk data can be written into the free buffer pool 1320 in the external SDRAM memory, along with the added IB headers and PSN numbers. As shown in FIG. 13, only the temporary linked list 1321 of buffer pointers in the context memory is updated, while the main linked list 1330 of buffer pointers for a given vHBA remains intact.

In accordance with an embodiment of the invention, multiple contexts can be opened for different disk read operations. When the disk read data for a newly opened context arrives, the system can read out stored data for a previously opened context from the external SDRAM memory, and update the command in the IB header at the end of the context list, if necessary. For example, if the disk read data for the given context is more than IB MTU, the command en-queued in the IB header, "RDMA write first", can be changed to "RDMA write only," and if the command en-queued in the IB header is "RDMA write middle," it can be changed to "RDMA write last."

As shown in FIG. 13, when the FC/IB domain receives data from a different context B 1302, the temporary linked list 1321 can be merged into the main linked list 1330 for the vHBA 1303. For example, the tail pointer of the main linked list 1330 for vHBA 1303 can be changed to the head pointer of the temporary linked list 1321, and the tail pointer of the temporary linked list 1321 can become the new tail pointer for the main linked list 1330. Then, the data for the new context can be written into the new context memory with new PSN and temporary pointers for that context can be updated accordingly.

Similarly, when the system needs to the perform a command, such as a "RDMA write only" command, a "RDMA write last" command, a "Send Only" command, and a RDMA read request, in a new context, the previously opened context can be closed and the temporary linked list 1321 may be merged into the main linked list 1330.

Figure 14:
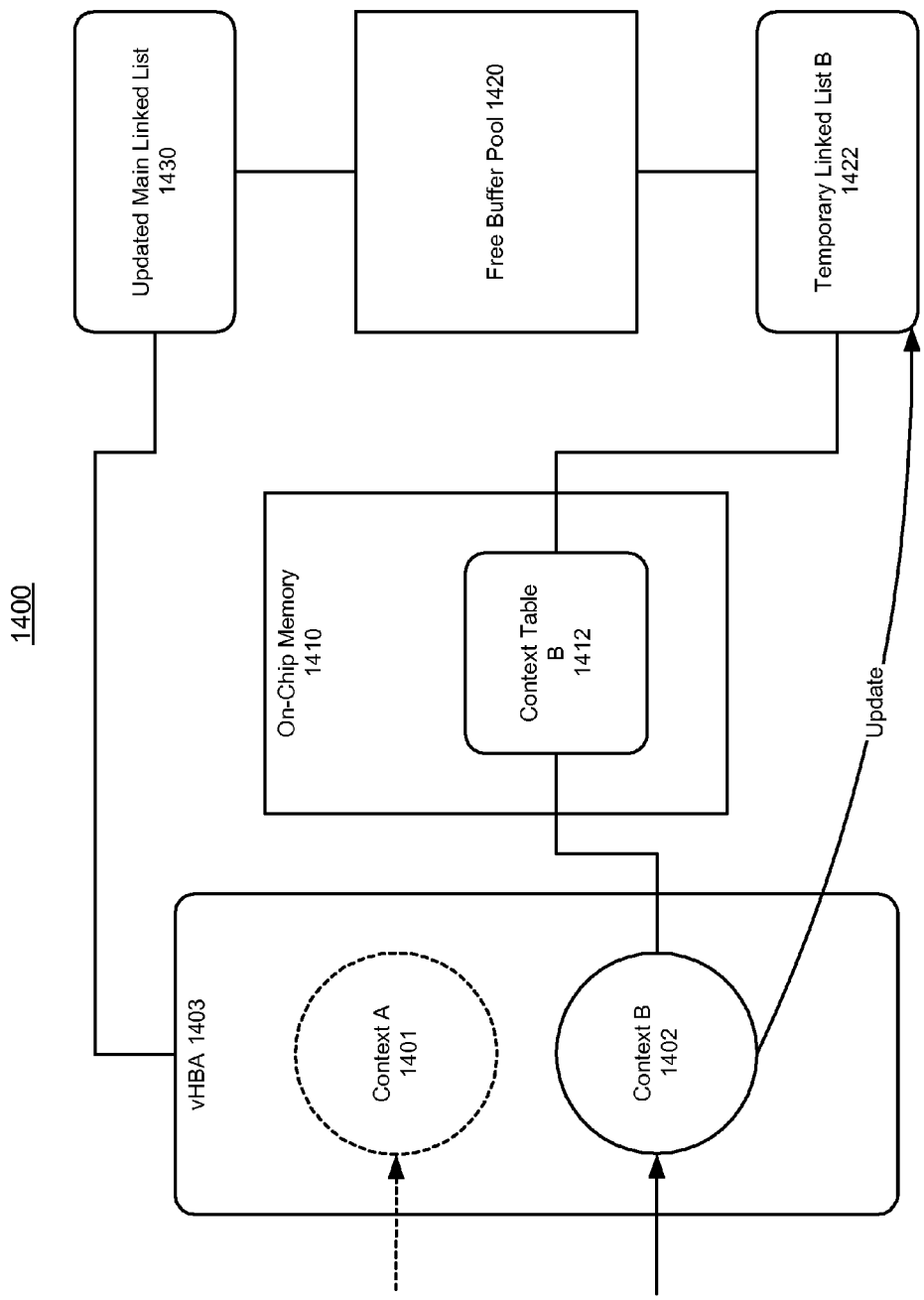
FIG. 14 shows an illustration of using a hybrid link list structure to avoid head-of-line blocking, in accordance with an embodiment of the invention.

FIG. 14 shows an illustration of using a hybrid link list structure to avoid head-of-line blocking, in accordance with an embodiment of the invention. As shown in FIG. 14, after the context A 1401 is closed and the main linked list 1430 for vHBA 1403 is updated, an I/O device 1400, e.g. a chip representing a FC/IB domain, can open a new context table B 1412 in an on-chip memory 1410 for the context B 1402. Furthermore, the context table B 1412 can maintain a new temporary linked list B 1422, which contains buffer pointers that point to the packet buffers allocated from the free buffer pool 1420.

As shown in FIG. 14, after the system can avoid head-of-line blocking, where the handling of the disk read data (or RDMA read request) received in context B 1402 is blocked by the processing of the disk read data received in context A 1401.

Thus, disk read data for different contexts in a given vHBA can be handled in parallel.

Figure 15:
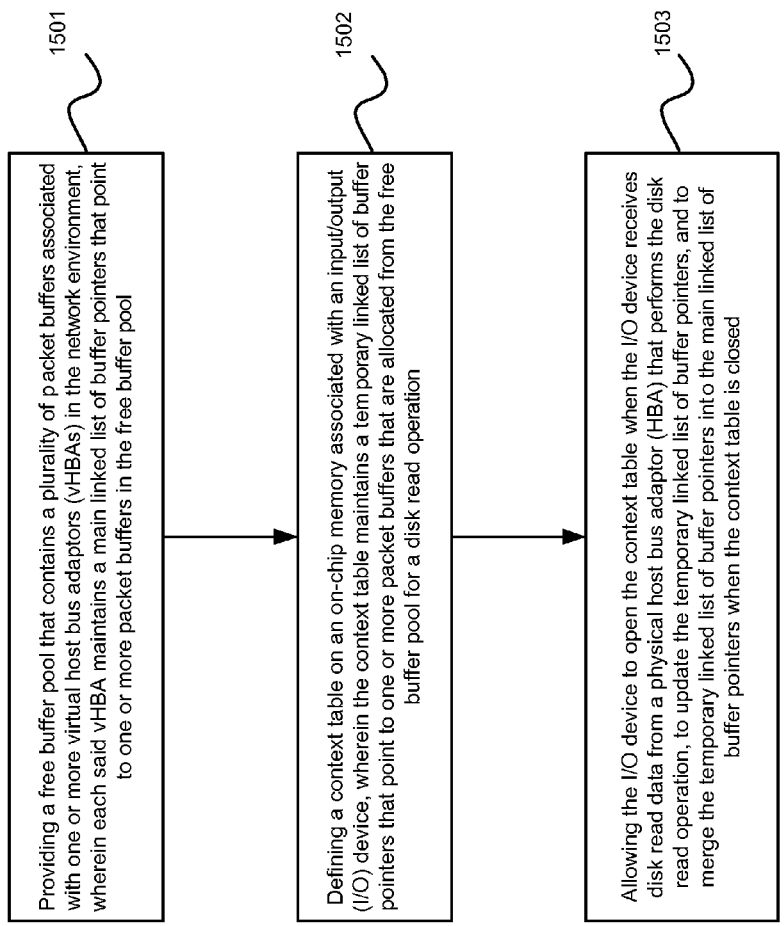
FIG. 15 illustrates an exemplary flow chart for using a hybrid link list structure to avoid head-of-line blocking, in accordance with an embodiment of the invention.

FIG. 15 illustrates an exemplary flow chart for using a hybrid link list structure to avoid head-of-line blocking, in accordance with an embodiment of the invention. As shown in FIG. 5, at step 1501, the system can provide a free buffer pool that contains a plurality of packet buffers associated with one or more virtual host bus adaptors (vHBAs) in the network environment, wherein each said vHBA maintains a main linked list of buffer pointers that point to one or more packet buffers in the free buffer pool. Furthermore, at step 1502, the system can define a context table on an on-chip memory associated with an input/output (I/O) device, wherein the context table maintains a temporary linked list of buffer pointers that point to one or more packet buffers that are allocated from the free buffer pool for a disk read operation. Then, at step 1503, the system can allow the I/O device to open the context table when the I/O device receives disk read data from a physical host bus adaptor (HBA) that performs the disk read operation, to update the temporary linked list of buffer pointers, and to merge the temporary linked list of buffer pointers into the main linked list of buffer pointers when the context table is closed Unified Memory Structure In accordance with an embodiment of the invention, as the disk read data comes from the HBA chip, the system can store the disk read data in various data buffers within a unified memory structure.

Figure 16:
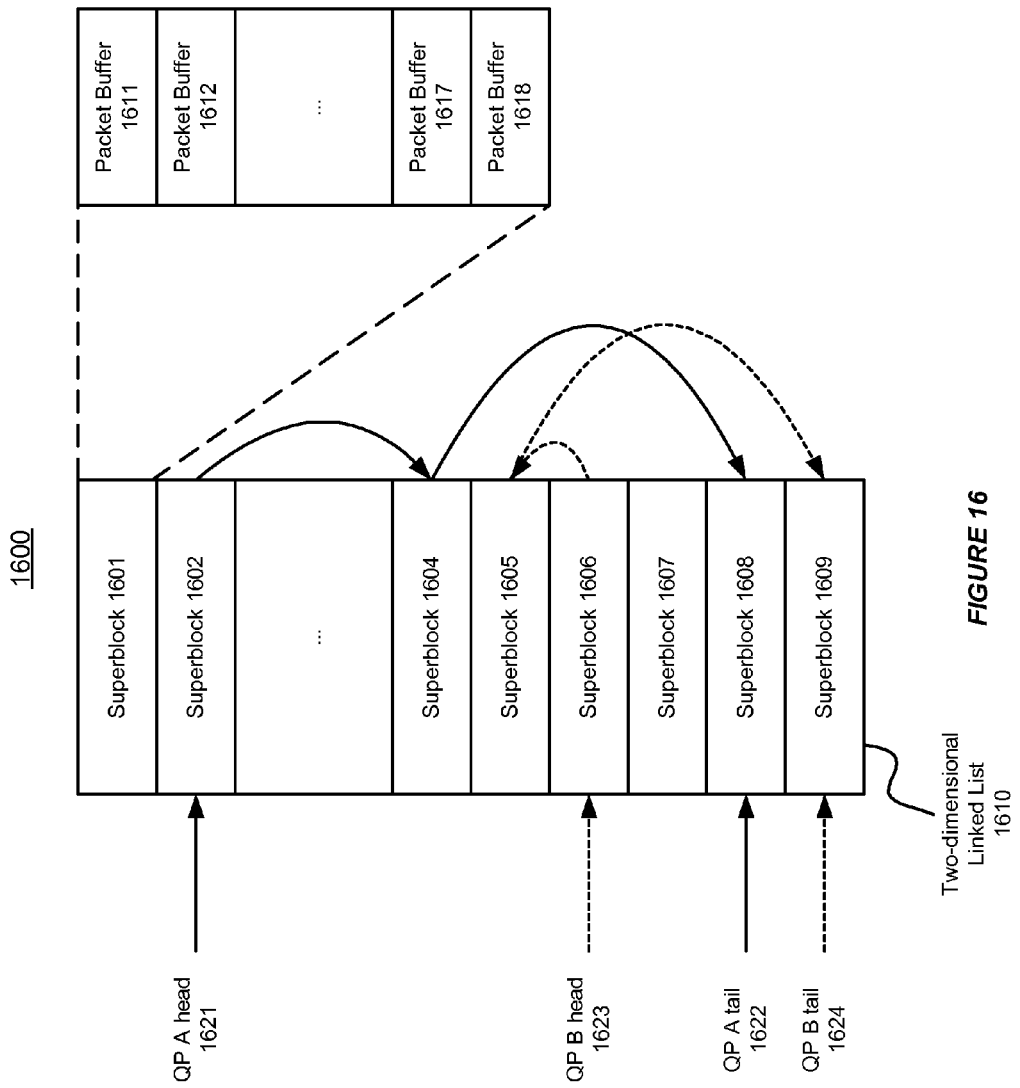
FIG. 16 shows an illustration of supporting a two-dimensional linked list structure for an I/O device, in accordance with an embodiment of the invention.

FIG. 16 shows an illustration of supporting a two-dimensional linked list structure for an I/O device, in accordance with an embodiment of the invention. As shown in FIG. 16, the system can use a two-dimensional linked list 1610 in a free buffer pool 1600 to manage the ingress packet buffers. The two-dimensional linked list 1610 can include a plurality of entries, each of which can be a superblock (e.g. superblocks 1601-1609).

In accordance with an embodiment of the invention, a superblock 1601-1609 can represent multiple packets stored in consecutive memory locations. Additionally, each superblock 1601-1609 can internally point to a list of packet buffers for buffer management. Thus, the two-dimensional linked list structure can be highly efficient from the on-chip resource usage perspective, and the system can minimize the size of on-chip linked list memory while maximizing the number of buffered packets.

For example, in order to accommodate various sizes of IB packets (including overhead), the two-dimensional linked list 1610 can include 8K superblocks. Furthermore, each superblock can be in the size of 64 KB (512 Kb), which can hold eight packets (each has a size of 8 KB). As shown in FIG. 16, the superblock 1601 can include eight packet buffers, such as packet buffers 1611-1618.

Moreover, the two-dimensional linked list 1610 allows the FC/IB domain to store disk read data targeting different QPs in an IB domain. As shown in FIG. 16, the FC/IB domain can use different pointers to access various linked list of superblocks in the two dimensional linked list 1610. For example, the FC/IB domain can maintain a QP A head pointer 1621 (and/or a QP A tail pointer 1622), which points to a linked list of superblocks including a superblock 1602, a superblock 1604, and a superblock 1608. Also, the FC/IB domain chip can maintain a QP B head pointer 1623 (and/or a QP B tail pointer 1624), which points to a linked list of superblocks including a superblock 1606, a superblock 1605, and a superblock 1609.

In accordance with an embodiment of the invention, the system can support the efficient use of an external DRAM memory by dynamically merging a two dimensional hybrid linked list 1610 with a one-dimensional linked list for a given Infiniband (IB) RC QP connection. Thus, the system can avoid wasting memory space for storing packets in small size in superblocks, the size of which is fixed.

For example, the FC/IB domain can query the free buffer pool 1600 for buffers to perform a disk read request. Then, the FC/IB domain can post a disk read request IOCB to the physical HBA, if enough packet buffers are available in the free buffer pool 1600. The amount of buffers requested by the disk read request can be reserved in the free buffer pool, and may not be used by any other subsequent requests until the current context is freed up by the FC/IB domain.

Additionally, the system can define a list of buffers (e.g. 4K buffers) for storing RDMA read requests. The system can ensure that a guaranteed space in the external memory is available for the RDMA read request and the RDMA read request may not be blocked by a RDMA write operation, whenever a RDMA read request is issued.

If only the two-dimensional linked list 1610 is used, the system may need to reserve 64K (the size of a superblock)*4K*128 bytes in the memory, in order to provide the guaranteed 4K packet buffers shared across 128 queue pairs (or vHBAs) for RDMA read requests. This approach can be wasteful, since it is substantially more than the packet buffer memory usage, which is 8 k (the size of a packet buffer)*4K*128 bytes.

Figure 17:
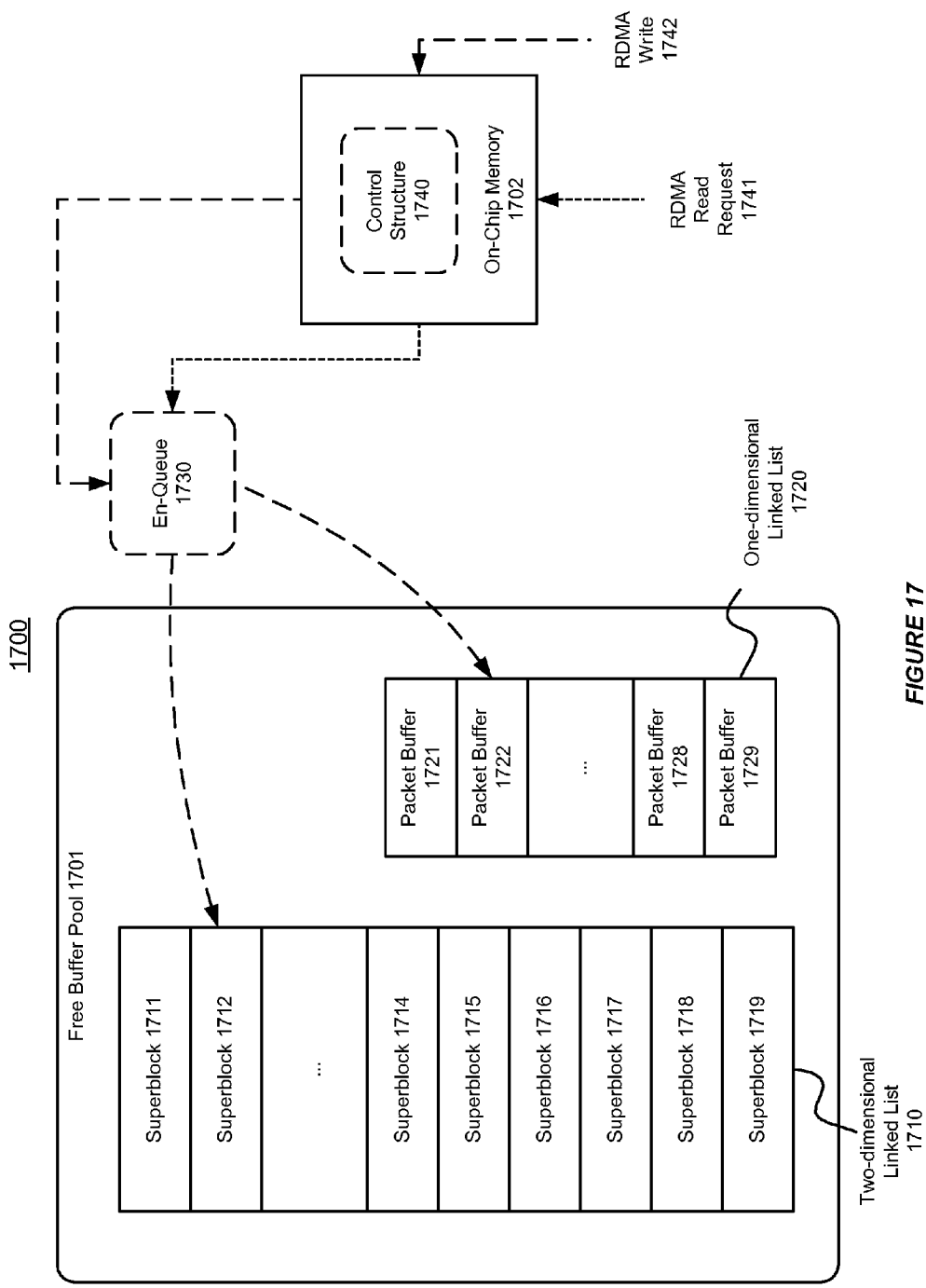
FIG. 17 shows an illustration of supporting efficient memory utilization for an I/O device, in accordance with an embodiment of the invention.

FIG. 17 shows an illustration of supporting efficient memory utilization for an I/O device, in accordance with an embodiment of the invention. As shown in FIG. 17, an I/O device 1700, e.g. a chip representing a FC/IB domain, can use a free buffer pool 1701 to support the en-queue 1730 of various packets. The free buffer pool 1701 can include a two-dimensional linked list 1710, which contains superblocks 1711-1719, and a one-dimensional linked list 1720, which includes packet buffer 1721-1729. Here, the two-dimensional linked list 1710 can resemble the two-dimensional linked list 1610 as shown in FIG. 16.

In accordance with an embodiment of the invention, different types of transactions can be en-queued in the free buffer pool 1701. For example, these transactions can be used to perform a RDMA write command 1742 and a RDMA read request 1741.

When a packet is en-queued 1730, a free buffer can be allocated either from a two-dimensional linked list 1710 or from a single one-dimensional linked list 1720, based on the type of the transaction.

Furthermore, the system can maintain a linked list control structure 1740 on chip to maintain the states of various buffered packets. For example, the control structure 1740 can store a head pointer of the memory superblock location (e.g. SBLKHEAD with 13 bits), a head pointer of the packet offset location in a superblock (e.g. PKTHEAD with 3 bits), a tail pointer for the memory superblock location (e.g. SBLKTAIL with 13 bits), a tail pointer for the packet offset location in a superblock (e.g. PKTTAIL with 3 bits), and a flag indicating whether the packet buffer is allocated from the two-dimensional linked list or one-dimensional linked list (e.g. LISTTYPE with 1 bit). Furthermore, the control structure 1740 can store the depth information based on the number of QP/vHBA, and can store the width information based on needed control information.

In accordance with an embodiment of the invention, the system can support different en-queue scenarios.

If the en-queued transaction is for a RDMA write command, the system can get a buffer or a superblock from two-dimensional linked list 1710.

Otherwise, if the en-queued transaction is for a RDMA read request, the system can get a buffer from the one-dimensional linked list 1720 when there is no packet buffer left in the superblock allocated for a previous en-queued transaction.

On the other hand, an en-queued transaction for a RDMA read request can happen when a RDMA write operation is in progress. The system can en-queue the RDMA read request at the current packet location in the superblock allocated for the RDMA write operation, if a packet buffer is available.

Additionally, a packet buffer from the single linked list 1720 can be reserved for the particular QP/vHBA. This reserved buffer from the single linked list 1720 can be used either by a RDMA write packet or by a RDMA read request packet. Furthermore, the system can flag the LISTTYPE field in the control memory so that the de-queue logic and/or the read logic knows there is one packet en-queued in the single linked list 1720.

Thus, the system can achieve efficient packet processing and can avoid wasting external memory.

Figure 18:
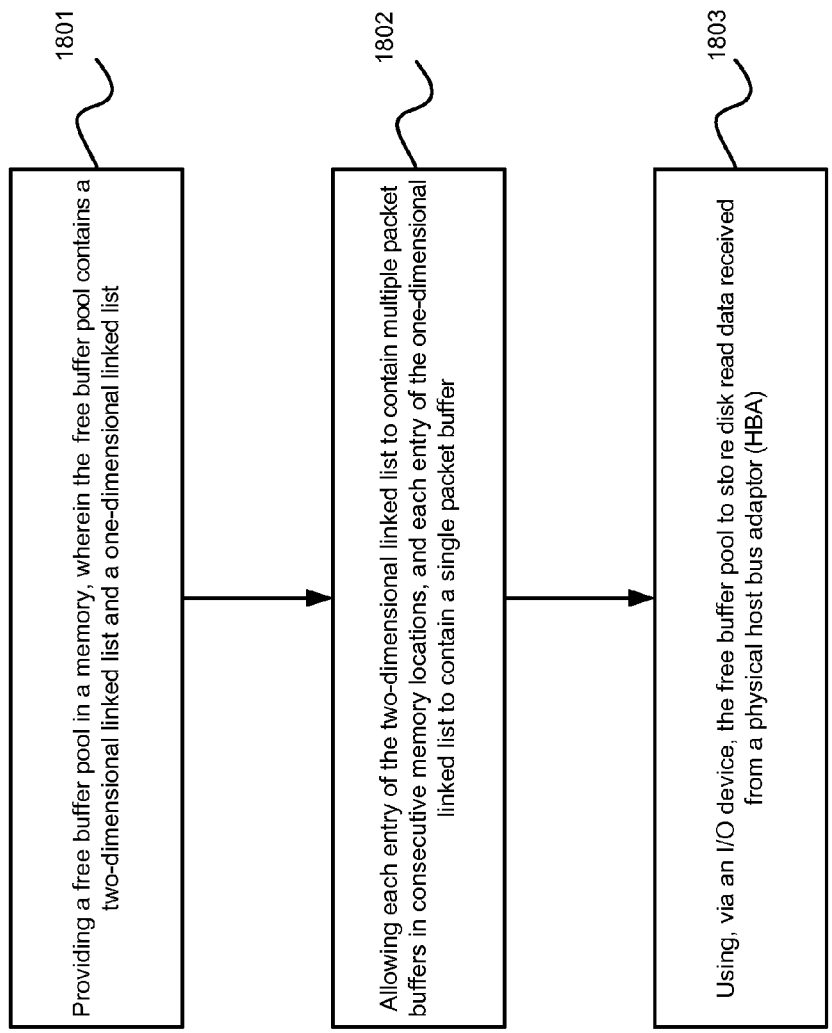
FIG. 18 illustrates an exemplary flow chart for supporting efficient packet processing in a computing environment, in accordance with an embodiment of the invention.

FIG. 18 illustrates an exemplary flow chart for supporting efficient packet processing in a computing environment, in accordance with an embodiment of the invention. As shown in FIG. 18, at step 1801, the system can provide a free buffer pool in a memory, wherein the free buffer pool contains a two-dimensional linked list and a one-dimensional linked list. Furthermore, at step 1802, the system can allow each entry of the two-dimensional linked list to contain multiple packet buffers in consecutive memory locations, and each entry of the one-dimensional linked list to contain a single packet buffer. Then, at step 1803, an I/O device can use the free buffer pool to store disk read data received from a physical host bus adaptor (HBA).

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting I/O virtualization in a computing environment, comprising:
    a free buffer pool that contains a plurality of packet buffers associated with one or more virtual host bus adaptors (vHBAs) in the network environment, wherein each said vHBA maintains a main linked list of buffer pointers that point to one or more packet buffers in the free buffer pool;
    a context table defined on an on-chip memory associated with an input/output (I/O) device, wherein the context table maintains a temporary linked list of buffer pointers that point to one or more packet buffers that are allocated from the free buffer pool for a disk read operation; and
    wherein the I/O device operates to
        open the context table when the I/O device receives disk read data from a physical host bus adaptor (HBA) that performs the disk read operation,
        update the temporary linked list of buffer pointers, and
        merge the temporary linked list of buffer pointers into the main linked list of buffer pointers when the context table is closed.

2. The system according to claim 1, wherein:
    the I/O device allows a server on an InfiniBand (IB) fabric to initiate the disk read operation.

3. The system according to claim 2, wherein:
    the I/O device adds an IB header and a sequence number to each packet received from the physical HBA.

4. The system according to claim 3, wherein:
    the I/O device operates to read out disk read data stored in the external memory when a complete message is available or when an IB maximum transmission unit (MTU) packet is available.

5. The system according to claim 2, wherein:
    each virtual HBA maintains a separate packet sequencing number (PSN) space in an IB domain.

6. The system according to claim 2, wherein:
    the I/O device maintains a different context table for a different disk read operation associated within a said vHBA.

7. The system according to claim 6, wherein:
    a context table is closed when the I/O device opens another context table associated the virtual HBA.

8. The system according to claim 7, wherein:
    the another context table maintains a new temporary linked list of buffer pointers that point to one or more packet buffers, which are allocated from the free buffer pool.

9. The system according to claim 7, wherein:
    the I/O device opens another context table, when the virtual HBA receives data from another disk read operation.

10. The system according to claim 7, wherein:
    the I/O device opens another context table, when the virtual HBA receives a command that is one of a RDMA write only command, a RDMA write last command, a send only command, and a RDMA read request command.

11. A method for supporting efficient packet processing in a computing environment, comprising:
    providing a free buffer pool that contains a plurality of packet buffers associated with one or more virtual host bus adaptors (vHBAs) in the network environment, wherein each said vHBA maintains a main linked list of buffer pointers that point to one or more packet buffers in the free buffer pool;
    defining a context table on an on-chip memory associated with an input/output (I/O) device, wherein the context table maintains a temporary linked list of buffer pointers that point to one or more packet buffers that are allocated from the free buffer pool for a disk read operation; and
    allowing the I/O device to
        open the context table when the I/O device receives disk read data from a physical host bus adaptor (HBA) that performs the disk read operation,
        update the temporary linked list of buffer pointers, and
        merge the temporary linked list of buffer pointers into the main linked list of buffer pointers when the context table is closed.

12. The method according to claim 11, further comprising:
    allowing a server on an InfiniBand (IB) fabric to initiate the disk read operation.

13. The method according to claim 12, further comprising:
    adding an IB header and a sequence number to each packet received from the physical HBA.

14. The method according to claim 13, further comprising:
    reading out disk read data stored in the external memory when a complete message is available or when an IB maximum transmission unit (MTU) packet is available.

15. The method according to claim 12, further comprising:
    configuring each virtual HBA to maintain a separate packet sequencing number (PSN) space in an IB domain.

16. The method according to claim 12, further comprising:
    maintaining a different context table for a different disk read operation associated within a said vHBA.

17. The method according to claim 16, further comprising:
    closing a context table when the I/O device opens another context table associated the virtual HBA.

18. The method according to claim 17, further comprising:
    configuring the another context table to maintain a new temporary linked list of buffer pointers that point to one or more packet buffers, which are allocated from the free buffer pool.

19. The method according to claim 17, further comprising:
    opening another context table, when the virtual HBA receives data from another disk read operation or one of a RDMA write only command, a RDMA write last command, a send only command, and a RDMA read request command.

20. A non-transitory machine readable storage medium having instructions stored thereon that when executed cause a system to perform the steps comprising:
    providing a free buffer pool that contains a plurality of packet buffers associated with one or more virtual host bus adaptors (vHBAs) in the network environment, wherein each said vHBA maintains a main linked list of buffer pointers that point to one or more packet buffers in the free buffer pool;
    defining a context table on an on-chip memory associated with an input/output (I/O) device, wherein the context table maintains a temporary linked list of buffer pointers that point to one or more packet buffers that are allocated from the free buffer pool for a disk read operation; and allowing the I/O device to
- open the context table when the I/O device receives disk read data from a physical host bus adaptor (HBA) that performs the disk read operation,
- update the temporary linked list of buffer pointers, and
- merge the temporary linked list of buffer pointers into the main linked list of buffer pointers when the context table is closed.

* * * * *

UNITED STATES PATENT AND TRADEMARK OFFICE
CERTIFICATE OF CORRECTION

| | | |
|---|---|---|
| PATENT NO. | : 8,898,353 B1 | Page 1 of 1 |
| APPLICATION NO. | : 14/096987 | |
| DATED | : November 25, 2014 | |
| INVENTOR(S) | : Aggarwal | |

It is certified that error appears in the above-identified patent and that said Letters Patent is hereby corrected as shown below:

In the Drawings

On sheet 15 of 18, in drawings, in figure 15, under Reference Numeral 1501, line 1, delete "p acket" and insert -- packet --, therefor.

On sheet 15 of 18, in drawings, in figure 15, under Reference Numeral 1502, line 2, delete "tem porary" and insert -- temporary --, therefor.

On sheet 18 of 18, in drawings, in figure 18, under Reference Numeral 1803, line 1, delete "sto re" and insert -- store --, therefor.

In the Specification

In column 6, line 11, delete "ICOB" and insert -- IOCB --, therefor.

In column 11, line 59, delete "closed" and insert -- closed. --, therefor.

In the Claims

In column 15, line 55, in Claim 7, delete "associated the" and insert -- associated with the --, therefor.

In column 16, line 42, in Claim 17, delete "associated the" and insert -- associated with the --, therefor.

Signed and Sealed this
Twenty-eighth Day of July, 2015

Michelle K. Lee
*Director of the United States Patent and Trademark Office*